United States Patent
Hirtenlehner et al.

(10) Patent No.: US 11,834,886 B2
(45) Date of Patent: Dec. 5, 2023

(54) DEVICE FOR PROTECTION AGAINST ENTRAPMENT FOR A DOOR FOR A VEHICLE, DOOR SYSTEM FOR A VEHICLE AND METHOD FOR PRODUCING A DEVICE FOR PROTECTION AGAINST ENTRAPMENT FOR A DOOR FOR A VEHICLE

(71) Applicant: KNORR-BREMSE GESELLSCHAFT MIT BESCHRÄNKTER HAFTUNG, Mödling (AT)

(72) Inventors: Thomas Hirtenlehner, Wolfsbach (AT); Peter Jetzinger, Enns (AT); Helmut Schaffer, Ungenach (AT)

(73) Assignee: KNORR-BREMSE GESELLSCHAFT MIT BESCHRÄNKTER HAFTUNG

( * ) Notice: Subject to any disclaimer, the term of this patent is extended or adjusted under 35 U.S.C. 154(b) by 509 days.

(21) Appl. No.: 16/649,014

(22) PCT Filed: Sep. 18, 2018

(86) PCT No.: PCT/EP2018/075171
§ 371 (c)(1),
(2) Date: Mar. 19, 2020

(87) PCT Pub. No.: WO2019/057695
PCT Pub. Date: Mar. 28, 2019

(65) Prior Publication Data
US 2020/0291709 A1    Sep. 17, 2020

(30) Foreign Application Priority Data

Sep. 19, 2017 (DE) .................... 10 2017 121 680.4
Jan. 17, 2018 (DE) .................... 10 2018 100 945.3

(51) Int. Cl.
*E05F 15/44*   (2015.01)
*B60J 5/04*   (2006.01)
(Continued)

(52) U.S. Cl.
CPC ............. *E05F 15/44* (2015.01); *B60J 5/0495* (2013.01); *B60J 5/0497* (2013.01); *B60J 5/062* (2013.01);
(Continued)

(58) Field of Classification Search
CPC ......... E05F 15/44; E05F 15/42; B60J 5/0497; B60J 5/0495; B60J 5/062; B60J 10/40;
(Continued)

(56) References Cited

U.S. PATENT DOCUMENTS 4,051,336 A * 9/1977 Miller ...................... B60J 10/00
49/27
4,273,974 A * 6/1981 Miller .................... H01H 3/142
49/27
(Continued)

FOREIGN PATENT DOCUMENTS

| AT | 414005 B | 8/2006 |
|---|---|---|
| CH | 688354 A5 | 8/1997 |

(Continued)

OTHER PUBLICATIONS

Written Opinion and International Search Report corresponding to PCT/EP2018/075171, dated Jan. 3, 2019.

*Primary Examiner* — Justin B Rephann
(74) *Attorney, Agent, or Firm* — Barnes & Thornburg LLP

(57) ABSTRACT

A device for protection against entrapment for a door for a vehicle includes an extruded profile extruded from an elastomer material, wherein the extruded profile includes a door leaf wall, which faces a contact edge of a door leaf of a door (Continued)

when the device is mounted on the door, a sealing wall arranged in an opposing position relative to the door leaf wall and a plunger for transferring a compression force into the extruded profile. The plunger is mounted on the sealing wall and extends along a transverse axis of the extruded profile away from the door leaf wall. The device also includes at least one switching element for detecting a compression of the extruded profile, wherein the at least one switching element is arranged in the region of the plunger between the door leaf wall and the plunger.

12 Claims, 18 Drawing Sheets

(51) Int. Cl.
  *B60J 5/06* (2006.01)
  *B60J 10/40* (2016.01)
(52) U.S. Cl.
  CPC ............ *B60J 10/40* (2016.02); *E05Y 2800/12* (2013.01); *E05Y 2800/26* (2013.01); *E05Y 2800/455* (2013.01); *E05Y 2900/51* (2013.01); *E05Y 2900/531* (2013.01)
(58) Field of Classification Search
  CPC ....... B60J 10/86; B60J 10/80; E05Y 2800/12; E05Y 2800/26; E05Y 2800/455; E05Y 2900/51; E05Y 2900/531
  USPC .......................................... 49/27, 28
  See application file for complete search history.

(56) References Cited

U.S. PATENT DOCUMENTS

| | | | | |
|---|---|---|---|---|
| 4,349,710 A * | 9/1982 | Miller | ............... | H01H 3/142 200/61.43 |
| 5,345,671 A * | 9/1994 | Miller | ............... | E05F 15/44 29/622 |
| 5,433,031 A * | 7/1995 | Dailey | ............... | E05F 15/40 49/27 |
| 6,125,591 A * | 10/2000 | Schmidhuber | ............... | B60J 10/40 49/477.1 |
| 6,233,872 B1 * | 5/2001 | Glagow | ............... | B60J 10/82 49/27 |
| 6,534,731 B1 * | 3/2003 | Beckhausen | ............... | B60J 10/00 200/61.43 |
| 7,202,674 B2 * | 4/2007 | Nakano | ............... | E05F 15/44 324/661 |
| 7,603,813 B2 * | 10/2009 | Hackl | ............... | E05F 15/42 49/27 |
| 8,061,084 B2 * | 11/2011 | Katzensteiner | ............ | B60J 10/40 49/27 |
| 8,854,061 B2 * | 10/2014 | Suhara | ............... | E05F 15/46 49/27 |
| 9,234,979 B2 * | 1/2016 | Bolbocianu | ............ | E05F 15/443 |
| 9,477,003 B2 * | 10/2016 | Pribisic | ............... | H03K 17/962 |
| 10,648,216 B2 * | 5/2020 | Taguchi | ............... | H03K 17/962 |
| 10,844,645 B2 * | 11/2020 | Hirtenlehner | ............ | E05F 15/44 |
| 11,261,643 B2 * | 3/2022 | Kawase | ............... | E05F 15/42 |
| 2005/0117270 A1 * | 6/2005 | Scherraus | ............... | B60J 5/101 49/27 |
| 2005/0179445 A1 * | 8/2005 | Nakano | ............... | E05F 15/46 324/661 |
| 2006/0070820 A1 | 4/2006 | Hackl | | |
| 2007/0024084 A1 * | 2/2007 | Oba | ............... | B60J 10/86 49/475.1 |
| 2011/0011004 A1 * | 1/2011 | Courrian | ............... | B61D 19/026 49/483.1 |
| 2011/0047879 A1 * | 3/2011 | Shimizu | ............... | E05F 15/70 49/358 |
| 2013/0307567 A1 * | 11/2013 | Bolbocianu | ............ | G01D 11/30 324/661 |
| 2014/0339842 A1 * | 11/2014 | Kawaguchi | ............ | E05F 15/44 296/1.04 |
| 2016/0137043 A1 * | 5/2016 | Baba | ............... | B60J 10/277 49/483.1 |
| 2016/0144699 A1 * | 5/2016 | Salles | ............... | E05F 15/42 49/483.1 |
| 2017/0305247 A1 * | 10/2017 | Salles | ............... | B61D 19/00 |
| 2018/0348945 A1 * | 12/2018 | Taguchi | ............... | G06F 3/047 |
| 2019/0100955 A1 * | 4/2019 | Hirtenlehner | ............ | E05F 15/46 |
| 2019/0210259 A1 * | 7/2019 | Hattori | ............... | B29C 45/1742 |
| 2019/0255923 A1 * | 8/2019 | Salles | ............... | B61D 19/026 |
| 2020/0002990 A1 * | 1/2020 | Kawase | ............... | B61D 19/026 |
| 2020/0149337 A1 * | 5/2020 | Friedrich | ............... | E05F 15/44 |
| 2020/0190897 A1 * | 6/2020 | Grein | ............... | B60J 10/00 |

FOREIGN PATENT DOCUMENTS

| | | |
|---|---|---|
| DE | 102010046632 A1 | 3/2012 |
| EP | 0791716 A1 | 8/1997 |
| EP | 2532820 A2 | 12/2012 |

* cited by examiner

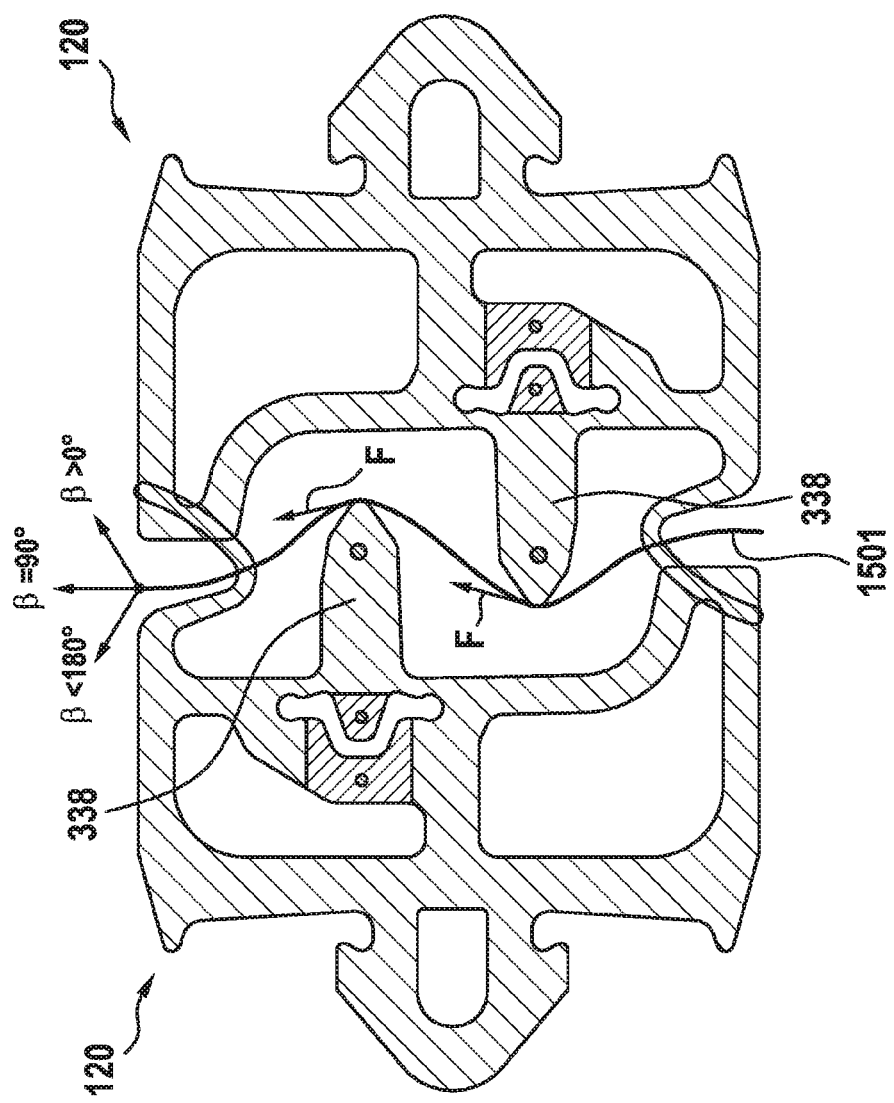
Fig. 15
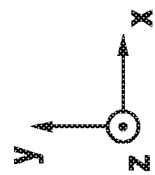

DEVICE FOR PROTECTION AGAINST ENTRAPMENT FOR A DOOR FOR A VEHICLE, DOOR SYSTEM FOR A VEHICLE AND METHOD FOR PRODUCING A DEVICE FOR PROTECTION AGAINST ENTRAPMENT FOR A DOOR FOR A VEHICLE

CROSS REFERENCE AND PRIORITY CLAIM

Field

Disclosed embodiments relate to a device for protection against entrapment for a door for a vehicle, to a door system for a vehicle and to a method for producing a device for protection against entrapment for a door for a vehicle.

BACKGROUND

Detection possibilities where a sensor system, such as, for example, safety switch strips, is installed after extrusion of a finger protection profile are most commonly known to date to prevent entrapment and possibly even a person being dragged along by a door of a vehicle.

SUMMARY

Against that background, disclosed embodiments create an improved device for protection against entrapment for a door for a vehicle, an improved door system for a vehicle and an improved method for producing a device for protection against entrapment for a door for a vehicle.

Disclosed embodiments provide a device for protection against entrapment for a door for a vehicle, by a door system for a vehicle and by a method for producing a device for protection against entrapment for a door for a vehicle.

BRIEF DESCRIPTION OF THE FIGURES

Exemplary embodiments of the approach presented here are explained in more detail in the following description with reference to the figures, in which:

FIG. 15 shows a schematic representation of devices according to an exemplary embodiment;

DETAILED DESCRIPTION

Figure 1:
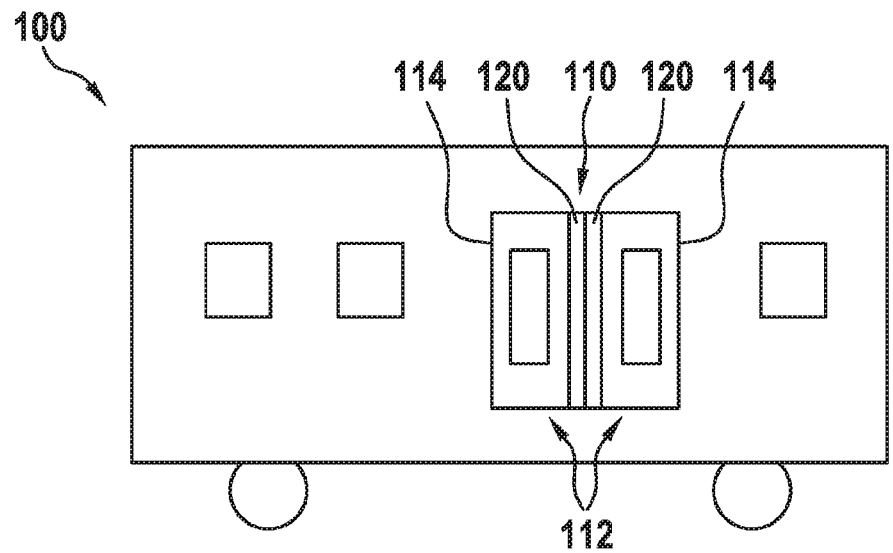
FIG. 1 shows a schematic representation of a vehicle with a door system according to an exemplary embodiment.

According to embodiments, in particular a switching element, with an extrusion profile with an extruded switching element or a switching element integrated into an extrusion profile, can be provided for integrated protection against entrapment or integrated entrapment detection. In contrast to detection possibilities for protection against entrapment where a sensor system is installed after extrusion of a finger protection profile, in the case of the device, a switching element can already be directly integrated into the extrusion profile or can be extruded with the extrusion profile. In this case, the extrusion profile can include, in particular, regions with increased rigidity and regions with reduced rigidity as well as a specifically designed geometry in order to be able to detect entrapped objects in a more reliable manner Consequently, for example, a probability of an entrapment or even of a person being dragged along by an on-coming vehicle is able to be reduced. In this connection, in particular a reliable detection of material can be realized.

According to embodiments, an integral design can be advantageously realized which enables a reduction in components as multiple functions, such as the protection against entrapment, entrapment detection and "entrapment pain" can be fused in one component. A simple operating principle is provided by an encapsulated, maintenance-free system which is resistant to external influences. Evaluation with existing door controls is possible. A malfunction can be detected and in certain realization variants there is an increased protection against vandalism. In addition, the device can be mounted on a door in a simple manner as a result of a mounting web formed at the same time. In particular in the case of double-leaf doors, by having one device in each case on each door leaf, it is also possible, consequently, to realize two equal-value switching safety strips or molded parts which both, in the case of the required defined events, such as, for example, entrapment of a cuboid or of another three-dimensional object and also of a piece of material, switch at different times and in a reliable manner and consequently are also able to reduce a probability of a person being dragged along as a result of secure and timely detection.

A device for protection against entrapment for a door for a vehicle includes the following features:

an extrusion profile, wherein the extrusion profile is extruded from an elastomer material, wherein the extrusion profile includes a door leaf wall which, with the device in a state mounted on the door, faces an impact edge of a door leaf of the door, a sealing wall which is arranged opposite with reference to the door leaf wall and an actuating plunger for transmitting a compression force into the extrusion profile, wherein the actuating plunger is arranged on the sealing wall and extends away from the door leaf wall along a transverse axis of the extrusion profile; and at least one switching element for detecting a compression of the extrusion profile, wherein the at least one switching element is arranged between the door leaf wall and the actuating plunger in the region of the actuating plunger.

The vehicle, for example, can be a vehicle for passenger transport. In particular, the vehicle can be realized as a rail vehicle. The system can be a door system of the vehicle. The device can also be designated as a finger protection strip. The features of the extrusion profile can be continuously extrudable at the same time. The door leaf wall and the sealing wall can include extension planes which are parallel or approximately parallel to one another. The extrusion profile can include an extrusion axis which can extend along the extension planes and normally to the transverse axis. The switching element can include an electrically conductive material and at least two electrical conductors. As an alternative to this, the switching element can include at least one fiber optic cable or other devices suitable for detecting the compression. The actuating plunger can be realized in order, on contact with an entrapped object, to be set into a movement with at least one movement component along the transverse axis, and, in addition to this or as an alternative to it, to be offset transversely to the transverse axis with at least one movement component. The compression force is transmittable in particular to the switching element via the actuating plunger. The actuating plunger can extend over its entire length or in part along the transverse axis. The at least one switching element can be integrated into the extrusion profile and can consequently be extrudable and able to be cut to length with the extrusion profile.

According to an embodiment, the device can include a mounting web. The mounting web can extend along the transverse axis of the extrusion profile. In this case, the door leaf wall and the sealing wall can be connected together via the mounting web. In this connection, the mounting web can be arranged offset with respect to the actuating plunger along an extension plane of the sealing wall. The mounting web can be aligned normally with reference to the extension planes. The mounting web can extend over its entire length or in part along the transverse axis. The extrusion profile can include a cavity, which can be divided at least by the mounting web into at least two chambers between the door leaf wall and the sealing wall. The advantage of such an embodiment is that a rigidity of the extrusion profile can be increased and when the device is mounted on the door, a force flow can be directed past the switching element.

As an alternative to this, the extrusion profile can be formed as a solid profile. In this case, a volume of the extrusion profile can be realized totally or at least in part by the elastomer material between the door leaf wall and the sealing wall. The advantage of such an embodiment is that a rigidity of the extrusion profile can be increased and when the device is mounted on the door, a force flow can be directed past the switching element.

In addition, the switching element can include a first electrically conductive portion and a second electrically conductive portion which can be separated from one another by a space which is compressible by the compression force. Each electrically conductive portion can include an electrically conductive material and at least one electrical conductor. The advantage of such an embodiment is that the compression can be detected in a simple and certain manner.

In this case, the first portion can be arranged on the sealing wall facing the door leaf wall in the region of the switching plunger. The second portion can be arranged between the first portion and the door leaf wall with reference to the transverse axis. As an alternative to this, the space which is compressible by the compression force can extend along the transverse axis. The advantage of such an embodiment is that the electrically conductive portions can be formed suitably depending on the requirement. In this case, it can be achieved that the switching element only switches, for example, when a force acts on the actuating plunger in a predefined direction.

In this case, the second portion of the switching element can also be arranged on a partition wall or as a part portion of a partition wall between the sealing wall and the door leaf wall. In this connection, the partition wall can be connected to the mounting web and the sealing wall. The advantage of such an embodiment is that a compression already triggered by low compression forces is able to be detected in a reliable manner.

In addition, in this connection, a ratio between a dimension of the actuating plunger along the transverse axis and a dimension of the first portion of the switching element along the transverse axis can include a predefined value. The advantage of such an embodiment is that a sensitivity of a detection of the compression is able to be adjusted on the manufacturing side using the ratio depending on the provided application case of the device.

According to an embodiment, the extrusion profile can include a sealing surface and a sealing element. In this connection, the sealing surface and the sealing element can be connected to the sealing wall and can extend away from the door leaf wall. In this case, the actuating plunger can be arranged between the sealing surface and the sealing element. In other words, the sealing surface and the sealing element can be formed as projection portions which extend away from the sealing wall in the direction of the door leaf wall. The advantage of such an embodiment is that a complementary interaction between the device and a further device is able to be achieved. In addition, in this connection, an advantageous pressing tolerance of two devices relative to one another can be achieved along the transverse direction. In the case of a complementary interaction, the sealing surface of a first device and the sealing element of a second device can interact and the sealing element of the first device and the sealing surface of the second device can interact.

In this case, the sealing surface can include an extension plane which can be parallel to the extension plane of the sealing wall. In this connection, a dimension of the sealing surface transversely to the transverse axis can be greater than a predefined admissible offset of the door transversely to the transverse axis with reference to a reference object. A transverse alignment can also include an orthogonal alignment. The advantage of such an embodiment is that even in the case of an offset of a door and consequently a device attached to the door relative to a required position, reliable sealing of a door gap is able to be achieved.

In particular, in this case, the sealing element can be formed as a sealing lip, a sealing balloon, a double balloon and, in addition to this or as an alternative to it, a double lip. The advantage of such an embodiment is that a reliable sealing of a door gap is able to be achieved.

In this connection, an end of the actuating plunger remote from the sealing wall can also be at a first distance to the sealing wall. In addition, an end of the sealing element remote from the sealing wall can also be at a second distance to the sealing wall. In addition, an end of the sealing surface remote from the sealing wall can be at a third distance to the sealing wall. In this case, the first distance can be smaller than the second distance and greater than the third distance. As an alternative to this, the first distance can be greater than the second distance and smaller than the third distance. Once again as an alternative to this, the first distance, the second distance and the third distance can be the same size within a tolerance range. The advantage of such an embodiment is that a pressing tolerance can at least be maintained also with reliable sealing of a door gap. In addition, the distances can be chosen in a suitable manner depending on the requirement.

According to an embodiment, the device can have at least one reinforcement element. In this connection, the reinforcement element can be integrated into the extrusion profile. The reinforcement element can be integrated in the actuating plunger and, in addition to this or as an alternative to it, in a part portion of the extrusion profile adjacent to the sealing wall. The reinforcement element can be realized as a metal wire, metal band or the like. In this case, the reinforcement element can function as a device for protection against cuts, as a device for protection against vandalism or the like. The advantage of such an embodiment is that certain protection against damage, willful destruction, vandalism and the like for the device can be provided in a simple manner Consequently, entrapment detection can still be rendered even after a confirmation test. The reinforcement element can serve for increasing the rigidity of at least a part portion of the extrusion profile and can consequently also bring about vandalism protection against an object being pressed transversely to the transverse axis against the extrusion profile or vandalism protection against the switching element being actuated as a result of pressure with an object transversely to the transverse axis.

In addition, the extrusion profile can include an attachment portion for attaching the device to the door. In this connection, the attachment portion can be connected to the door leaf wall and can extend along the transverse axis in the direction away from the sealing wall. In particular, the attachment portion can be connected to the door leaf wall in the region of the mounting web. In other words, the attachment portion and the mounting web can be arranged in a collinear manner. The advantage of such an embodiment is that the device can be attached in a simple and secure manner to a door and compression of the extrusion profile in the region of the at least one switching element can be avoided.

A door system for a vehicle includes the following features:
a door having at least one door leaf, wherein an embodiment of the device named above is arranged on an impact edge of at least one door leaf.

In connection with the door system, at least one device, which is an embodiment of the device named above, can be advantageously deployed or used in order to realize protection against entrapment. In this case, a device can be attached or can become attached directly to a door leaf of the door, to a seal or to a profile element. If the door is designed with two door leaves, a first device can be arranged on a first door leaf and a second device can be arranged on a second door leaf. The first device and, in addition to this or as an alternative to it, the second device can be an embodiment of the device named above. The first device can also be formed differently relative to the second device.

According to an embodiment, the door system can also include at least one molded part. The molded part can function as a transition between a door seal of a door leaf of the door and the device. In this case, the molded part can be connectable or connected to the door leaf, to the door seal and, in addition to this or as an alternative to it, to the device. The advantage of such an embodiment is that using at least one such molded part, both a pressing along the transverse axis of the device and an offset transversely to the transverse axis with regard to a movement of the door leaf is able to be reduced or restricted.

A method for producing a device for protection against entrapment for a door for a vehicle includes the following steps:
extrude elastomer material to form an extrusion profile, wherein the extrusion profile includes a door leaf wall which, with the device in a state mounted on the door, faces an impact edge of a door leaf of the door, a sealing wall which is arranged opposite with reference to the door leaf wall and an actuating plunger for transmitting a compression force into the extrusion profile, wherein the actuating plunger is arranged on the sealing wall and extends away from the door leaf wall along a transverse axis of the extrusion profile;
integrate at least one switching element into the extrusion profile for detecting a compression of the extrusion profile, wherein the at least one switching element is arranged between the door leaf wall and the actuating plunger in the region of the actuating plunger; and
cut the extrusion profile to a desired length, wherein the switching element is cut to length with the extrusion profile.

An embodiment of the device named above can be advantageously produced by realizing the method for production.

According to an embodiment, the extrusion operation and the integration operation can be carried out jointly. In this case, the switching element can be extruded with the elastomer material. The advantage of such an embodiment is that an encapsulated, maintenance-free or low-maintenance component which is resistant to harmful external influences is able to be provided.

In the integration operation, the switching element and, in addition to this or as an alternative to it, a further switching element can also be vapor deposited onto the elastomer material. The advantage of such an embodiment is that switching elements can be formed in a simple and quick manner according to requirement.

FIG. 1 shows a schematic representation of a vehicle 100 having a door system 110 according to an exemplary embodiment. The vehicle 100, according to the exemplary embodiment shown here, is a rail vehicle. The door system 110 includes a door 112 having, purely as an example, two door leaves 114. In addition, the door system 110 includes, purely as an example, two devices 120 for protection against entrapment. Each device 120 is arranged on its own door leaf 114. In this case, the devices 120 are arranged on impact edges of the door leaves 114 facing one another. In other words, a door gap between the two door leaves 114 is sealed by the devices 120 or by the devices 120 among other things. The device 120 will be looked at in more detail with reference to the figures described below.

According to an exemplary embodiment, the two devices 120 are realized in an identical manner and, with the door 112 in a closed state, are arranged complementarily with respect to one another. According to another exemplary embodiment, the devices 120 can be formed and/or designed differently. In this connection, the devices 120 can deviate from one another with regard to an extrusion profile and/or a switching element of the same. For example, just one of the devices 120 can include a switching element.

Figure 2:
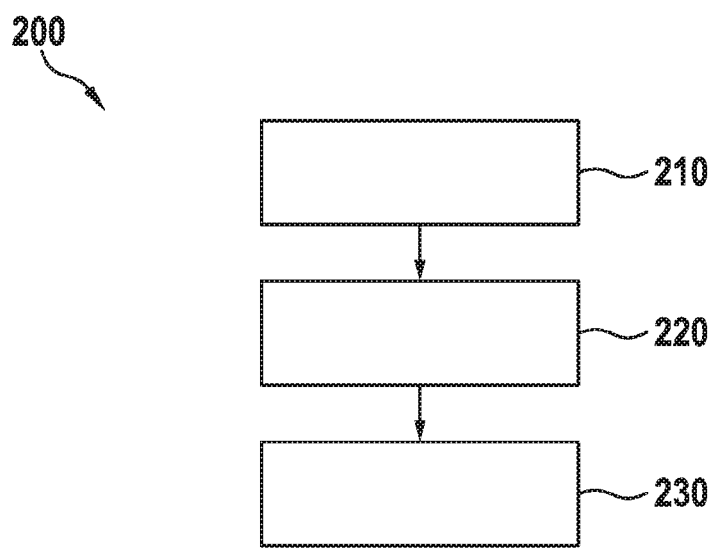
FIG. 2 shows a flow chart of a method for . . . according to an exemplary embodiment.

FIG. 2 shows a flow diagram of a method 200 for producing a device for protection against entrapment for a door for a vehicle according to an exemplary embodiment. Each of the devices from FIG. 1 and/or a device from one of the figures described below can be produced by carrying out the method 200. The method 200 includes a step 210 of extrusion, a step 220 of integration and a step 230 of cutting to length.

In the step 210 of extrusion, the elastomer material is extruded to form an extrusion profile. The extrusion profile includes a door leaf wall, a sealing wall and an actuating plunger. With the device in a state mounted on the door, the door leaf wall faces an impact edge of a door leaf of the door. The sealing wall is arranged opposite with reference to the door leaf wall. The door leaf wall and the sealing wall include extension planes which are parallel or approximately parallel to one another. The actuating plunger is designed to transmit a compression force into the extrusion profile. The actuating plunger is arranged on the sealing wall and extends away from the door leaf wall along a transverse axis of the extrusion profile.

In the step 220 of integration, at least one switching element is integrated into the extrusion profile to detect a compression of the extrusion profile. In this case, the at least one switching element is arranged between the door leaf wall and the actuating plunger in the region of the actuating plunger. Finally, in the step 230 of cutting to length, the extrusion profile is cut to a desired length. In this case, the switching element is cut to length with the extrusion profile.

Even if it is not explicitly shown in the representation of FIG. 2, according to an embodiment, the step 210 of extrusion and the step 220 of integration are carried out jointly. In this case, the switching element is extruded with the elastomer material. As an option, in the step 220 of integration, the switching element and/or a further switching element are vapor deposited onto the elastomer material.

Figure 3:
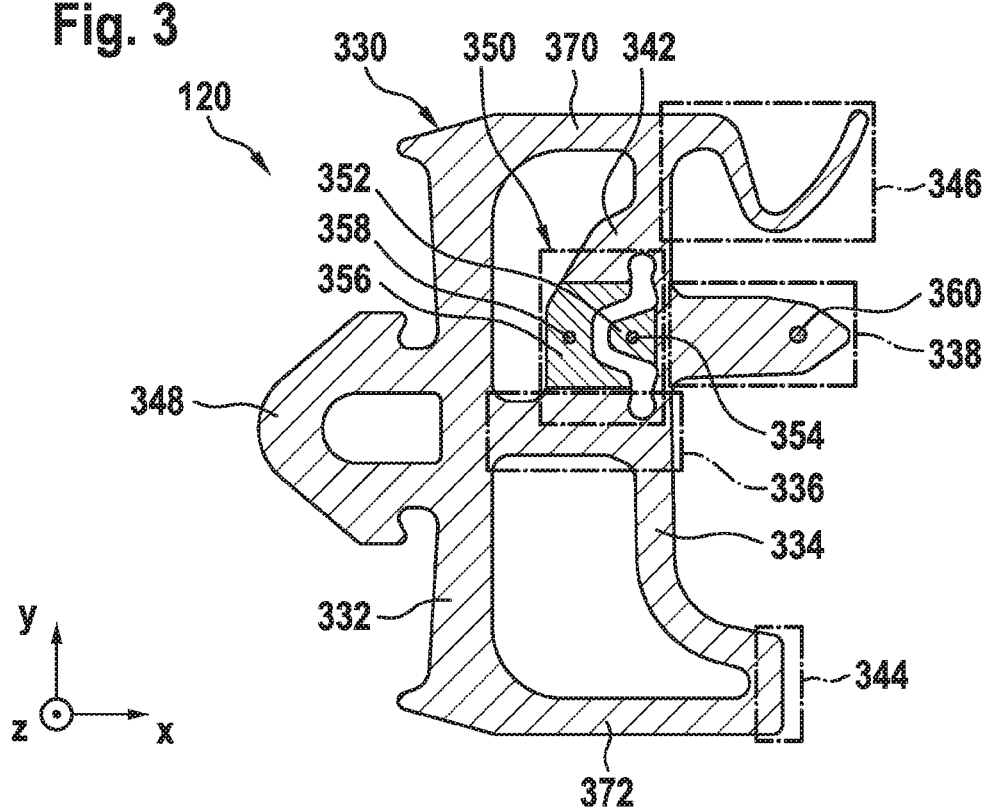
FIG. 3 shows a schematic representation of a device according to an exemplary embodiment.

FIG. 3 shows a schematic representation of a device 120 for protection against entrapment according to an exemplary embodiment. The device 120 is realized to enable protection against entrapment for a door for a vehicle. In this case, the device 120 can be deployed or used in connection with the door, the door system or the vehicle, as shown in FIG. 1. In other words, each device shown in FIG. 1 can correspond to or resemble the device 120 shown in FIG. 3.

The device 120 includes an extrusion profile 330 and at least one switching element 350. The extrusion profile 330 is extruded in one piece from the elastomer material. In this case, the at least one switching element 350 is integrated into the extrusion profile 330, which is extruded from the elastomer material, or is extruded and cut to length jointly with the same. An x axis, a y axis and a z axis of a three-dimensional system of coordinates are also provided in FIG. 3 for orientation. An extrusion axis, along which the extrusion profile 330 is extruded or which represents a longitudinal extension axis of the device 120, corresponds to the z axis in the representation in FIG. 3.

The extrusion profile 330 includes a door leaf wall 332, a sealing wall 334, a mounting web 336 and an actuating plunger 338. The door leaf wall 332, with the device 120 in a state mounted on the door of the vehicle, faces an impact edge of a door leaf of the door. The sealing wall 334 is arranged opposite with reference to the door leaf wall 332. The door leaf wall 332 and the sealing wall 334 include extension planes which are parallel to one another. A space or cavity with at least two chambers is arranged between the door leaf wall 332 and the sealing wall 334. The extension planes of the door leaf wall 332 and of the sealing wall 334 are spanned or defined by the y axis and the z axis. According to an exemplary embodiment, the extension planes of the door leaf wall 332 and of the sealing wall 334 are at least in part parallel or approximately parallel to one another. The extension planes of the door leaf wall 332 and of the sealing wall 334 can also be aligned in part or entirely in an oblique manner with respect to one another.

The mounting web 336 represents a portion of the extrusion profile 330 for increasing a rigidity of the extrusion profile 330. The mounting web 336 extends normally with reference to the extension planes along a transverse axis of the extrusion profile 330. The transverse axis corresponds to the x axis in FIG. 3. The door leaf wall 332 and the sealing wall 334 are connected together via the mounting web 336. The cavity between the door leaf wall 332 and the sealing wall 334 is also divided by the mounting web 336 into two chambers. According to an exemplary embodiment, the mounting web 336 extends in an oblique manner with respect to the transverse axis.

The actuating plunger 338 is arranged on the sealing wall 334 and extends along the transverse axis or x axis in the direction away from the door leaf wall 332. In addition, the actuating plunger 338 is arranged offset relative to the mounting web 336 along the extension plane of the sealing wall 334. In other words, the mounting web 336 and the actuating plunger 338 are connected to adjacent part portions on different sides of the sealing wall 334. The actuating plunger 338 is realized to transmit a compression force into the extrusion profile 320 and onto the switching element 350.

According to the exemplary embodiment shown in FIG. 3, the device 120 includes, as an example, just one switching element 350. The switching element 350 is arranged between the door leaf wall 332 and the actuating plunger 338 in the region of the actuating plunger 338. A part portion of the sealing wall 334 is arranged between the actuating plunger 338 and the switching element 350. The switching element 350 is realized to detect a compression of the extrusion profile 330 transmitted by the actuating plunger 338 into the extrusion profile 330.

The switching element 350, according to the exemplary embodiment shown and described in FIG. 3, includes a first electrically conductive portion 352 with a first electrical conductor 354 and a second electrically conductive portion 356 with a second electrical conductor 358. The first portion 352 and the second portion 356 are separated from one another by a space which is compressible by the compression force. The first electrical conductor 354 is embedded in the first portion 352. The second electrical conductor 358 is embedded in the second portion 356. The first portion 352 and the second portion 356 are formed or extruded from an electrically conductive material.

The first portion 352 is arranged on the sealing wall 334. More precisely, the first portion 352 is arranged in the region of the actuating plunger 338 on a side of the sealing wall 334 facing the door leaf wall 332. The second portion 356 is arranged between the first portion 352 and the door leaf wall 332 with reference to the transverse axis or x axis. More precisely, the second portion 356 according to the exemplary embodiment shown here is realized or formed on a partition wall 342 or as a part portion of a partition wall 342 between the sealing wall 334 and the door leaf wall 332. The partition wall 342 extends between the mounting web 336 and the sealing wall 334. The partition wall 342 is also connected to the mounting web 336 and to the sealing wall 334.

The extrusion profile 330 according to the exemplary embodiment shown in FIG. 3 also includes a sealing surface 344 and a sealing element 346. The sealing surface 344 and the sealing element 346 are connected to the sealing wall 334 and extend on a side of the sealing wall 334 remote from the door leaf wall 332 in the direction away from the door leaf wall 332. In this case, the actuating plunger 338 is arranged between the sealing element 346 and the sealing surface 344 with reference to the extension plane of the sealing wall 334. The sealing surface 344 includes an extension plane which is parallel to the extension plane of the sealing wall 334 and/or parallel to the extension plane of the door leaf wall 332. The sealing element 346 is formed as a sealing lip. Consequently, the sealing surface 344 and the sealing element 346 are realized as projection portions of the extrusion profile 330 relative to the sealing wall 334. According to an exemplary embodiment, the sealing wall 334 includes a curvature toward the sealing surface 344. The sealing element 346 is formed, as an example, in an S-shaped manner.

According to the exemplary embodiment shown in FIG. 3, an end of the actuating plunger 338 remote from the sealing wall 334 is arranged at a first distance from the sealing wall 334, an end of the sealing element 346 remote from the sealing wall 334 is arranged at a second distance to the sealing wall 334 and an end of the sealing surface 344 remote from the sealing wall 334 is arranged at a third distance to the sealing wall 334. The first distance is smaller than the second distance and greater than the third distance. Consequently, the sealing element 346 projects furthest away from the sealing wall 334. The sealing surface 344 projects the least distance away from the sealing wall 334. An advantageous pressing tolerance of the extrusion profile 330 or of the device 120 along the transverse axis or the x axis can thus be achieved.

The extrusion profile 330, according to the exemplary embodiment shown and described in FIG. 3, additionally includes an attachment portion 348. The device 120 can be attached to the door of the vehicle using the attachment portion 348. The attachment portion 348 is connected to the door leaf wall 332 in the region of the mounting web 336. In this case, the attachment portion 348 extends on a side of the door leaf wall 332 remote from the sealing wall 334 along the transverse axis or the x axis in the direction away from the sealing wall 334. Consequently, a part portion of the door leaf wall 332 is arranged between the mounting web 336 and the attachment portion 348. The attachment portion 348 includes a mushroom-shaped cross section.

In addition, the device 120, according to the exemplary embodiment shown in FIG. 3, includes a device for protection against cuts 360. The device for protection against cuts 360 is realized, for example, as a metal wire, metal bar or the like. According to the exemplary embodiment shown here, the device for protection against cuts 360 is arranged integrated or embedded in the actuating plunger 338.

In other words, FIG. 3 shows a cross section of the device 120 and consequently of the extrusion profile 330 with the switching element 350 for the integrated detection of entrapped objects. After an extrusion, the created endless material is to be cut to the desired length as required and electrical, where applicable optical, connections for the switching element 350 are to be attached. The elastomer, e.g. EPDM or silicone, should meet defined fire protection requirements (e.g. EN45545). A co-extruded, electrically conductive material of the portions 352 and 356 of the switching element 350 can include, among other things, the following electrically conductive materials: elastomers, e.g. EPDM or silicone, or elastomers, e.g. EPDM or silicone, in combination with metal wires. As an alternative to this, an electrical conductor or a reflector, for example, can also be applied as a switching element 350 in a further production process step, for example as a result of vapor depositing. As a further alternative to this, a fiber optic cable or a reflector, a switching strip or a band switch can be co-extruded or introduced subsequently into the extrusion profile 330 instead of electrically conducting strips. The mounting web 336 is formed to steer a force effect, when the device 120 is mounted on a door, in such a manner that the force flow is diverted or is directed past the switching element 338. Increased rigidity provided by the mounting web 336 promotes both the mounting on a door leaf and a functioning of safety devices, for example a detection of obstacles or the like.

According to an exemplary embodiment, the extrusion profile 330 includes a first outside wall 370 and a second outside wall 372. The first outside wall 370 connects first ends of the door leaf wall 332 and the sealing wall 334. The second outside wall 372 connects second ends of the door leaf wall 332 and the sealing wall 334. The mounting web 336 is arranged longitudinally to the first outside wall 370 and to the second outside wall 372. The mounting web 336 is arranged in a central third of a distance between the first outside wall 370 and the second outside wall 372. For example, the mounting web 336 is arranged centrally between the first outside wall 370 and the second outside wall 372.

Figure 4:
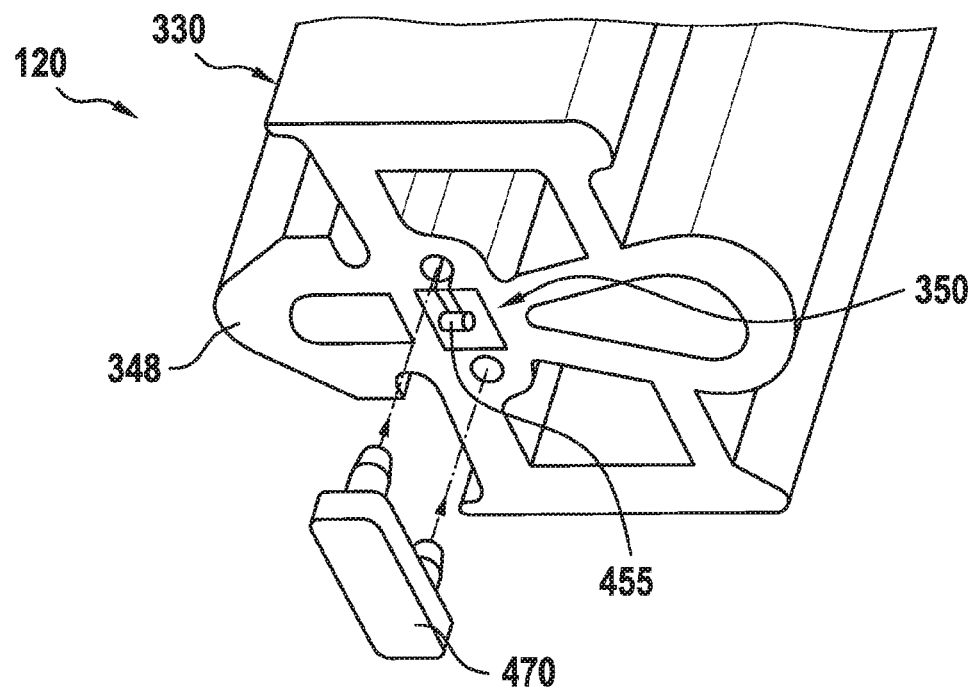
FIG. 4 shows a schematic representation of a device according to an exemplary embodiment.

FIG. 4 shows a schematic representation of a device 120 for protection against entrapment according to an exemplary embodiment. The device 120 corresponds to or resembles the device from FIG. 1 or FIG. 3. In this connection, a perspective view of the device 120 is shown. In the representation in FIG. 4, of the device 120 the extrusion profile 330, of which the attachment portion 348 is explicitly designated, and the switching element 350 are shown. In addition, a terminating resistor 455 and a plug 470 are shown.

The terminating resistor 455 is attached to the switching element 350. The terminating resistor 455 can enable function monitoring of the switching element 350 or of the device 120. A line breakage in the case of the switching element 350 or of an integrated electrical switching strip can be detected using the closed current principle. The terminating resistor 455 can be used for this purpose. The device 120 can then be encapsulated, in order to avoid, for example, ingress of moisture, on at least one end of the device using the plug 470. The plug 470 can be, for example, bonded on or injected on. The plug 470 can also be an injection molded part. In this connection, reference is also made to FIG. 20.

Figure 5:
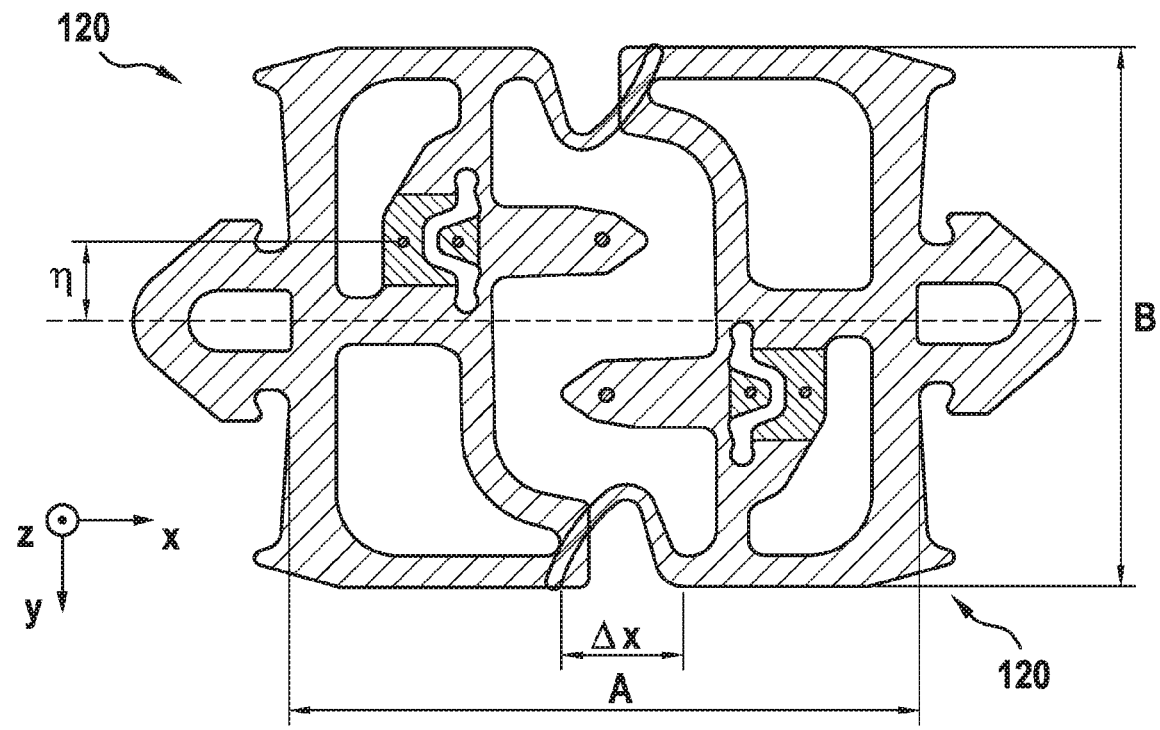
FIG. 5 shows a schematic representation of devices according to an exemplary embodiment.

FIG. 5 shows a schematic representation of devices 120 according to an exemplary embodiment. Two devices 120 are shown, each device corresponding to or resembling one of the devices shown and described previously. The devices 120 are arranged, as in the door system from FIG. 1, adjoining one another when the door is in a closed state. In this connection, a complementary arrangement of the devices 120 relative to one another can be seen. In this case, the sealing element of a first device 120 and the sealing surface of a second device 120 are in contact with one another, the sealing surface of the first device 120 and the sealing element of the second device 120 being in contact with one another.

In addition, FIG. 5 also shows dimensions and tolerances for a position of the devices 120 with reference to one another with a double-leaf entry door in a closed, locked state. A nominal rubber width A extends from the door leaf wall of the first device 120 to the door leaf wall of the second device 120. The nominal rubber width A is, for example, between 30 and 100 millimeters. A width B of a finger guard rubber or a width of a door leaf B represents a dimension of the devices 120 along the y axis in the extension planes of the door leaf wall or of the sealing wall. The width of B the finger guard rubber is, for example, between 20 and 50 millimeters. A pressing tolerance $\Delta x$ in the x direction represents an admissible position of the two devices 120 with respect to one another. In this case, the pressing tolerance $\Delta x$ is, for example, less than 10 millimeters. The switching element of each device 120 is arranged offset from the mounting web by an offset distance n transversely to the x axis. The offset distance n is, for example, a maximum of 10 millimeters. The offset distance n can also represent a distance of the switching element from a neutral phase so that the switching element or the device 120 can be used for exemplary door leaf forms with a maximum radius of curvature on a door leaf outside surface of up to R200 mm about the x axis, without functioning restrictions occurring or unwanted detection or triggering of the switching element being produced by a door leaf form.

Figure 6:
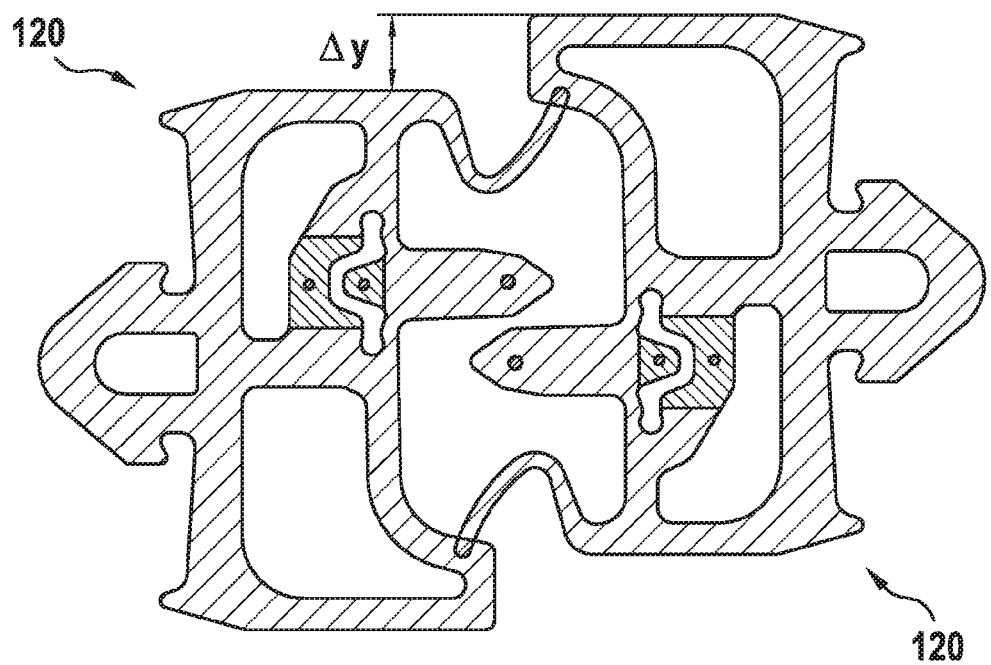
FIG. 6 shows a schematic representation of devices according to an exemplary embodiment.

FIG. 6 shows a schematic representation of devices 120 according to an exemplary embodiment. In this connection, the representation in FIG. 6 corresponds to the representation from FIG. 5 with the exception that the devices 120 are arranged displaced relative to one another along the y axis from FIG. 5 by a lateral offset $\Delta y$. A dimension of the sealing surface of each device 120 along the y axis is greater than the admissible lateral offset $\Delta y$ so that sufficient sealing surface is always present. The admissible lateral offset $\Delta y$ is, for example, less than 10 millimeters, i.e. $|\Delta y|<10$ mm. In particular, a positive lateral offset $\Delta y$ is shown in FIG. 6.

Figure 7:
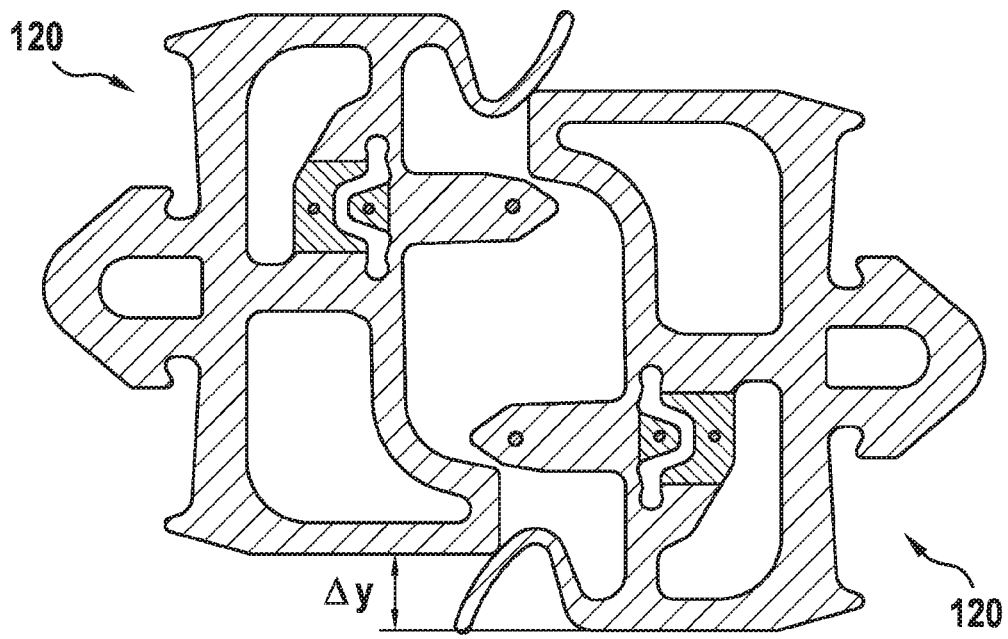
FIG. 7 shows a schematic representation of devices according to an exemplary embodiment.

FIG. 7 shows a schematic representation of devices 120 according to an exemplary embodiment. In this case, the representation in FIG. 7 corresponds to the representation from FIG. 6 with the exception that a negative lateral offset $\Delta y$ of the devices 120 relative to one another is shown.

Figure 8:
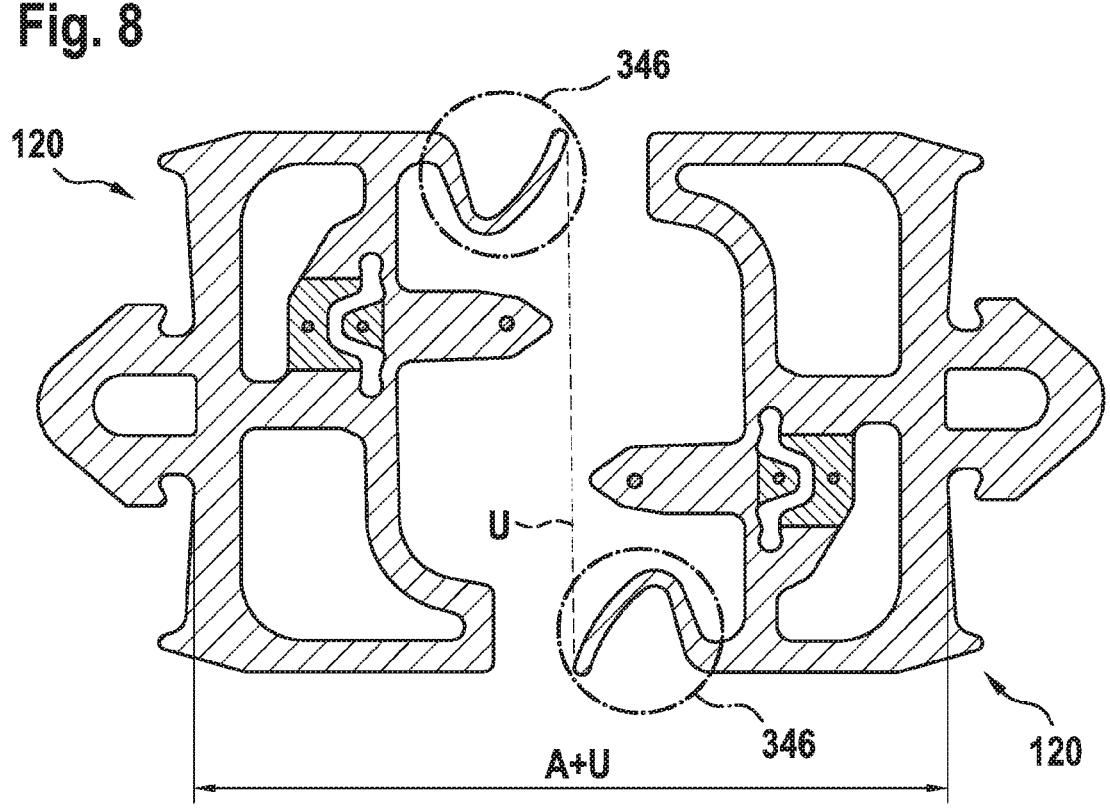
FIG. 8 shows a schematic representation of devices according to an exemplary embodiment.

FIG. 8 shows a schematic representation of devices 120 according to an exemplary embodiment. The representation in FIG. 8 corresponds, in this connection, to the representation from FIG. 5 with the exception that the devices 120 are arranged further apart from one another along the x axis or transverse axis. In this connection, sealing elements 346 of the devices 120 are explicitly designated. In addition, an overlap U is marked. The overlap U represents a loss of a clear inner width and is minimized. For example, the overlap U is less than 20 millimeters. The nominal rubber width A and the overlap U are also shown correspondingly in the representation of FIG. 8 in added form, i.e. A+U.

A maximum closing force or door closing force corresponds to a compressing of each sealing element 346. The maximum closing force can be, for example, less than 0.25 N/mm or Newtons per millimeter for an admissible application case maintaining predetermined tolerances.

Figure 9:
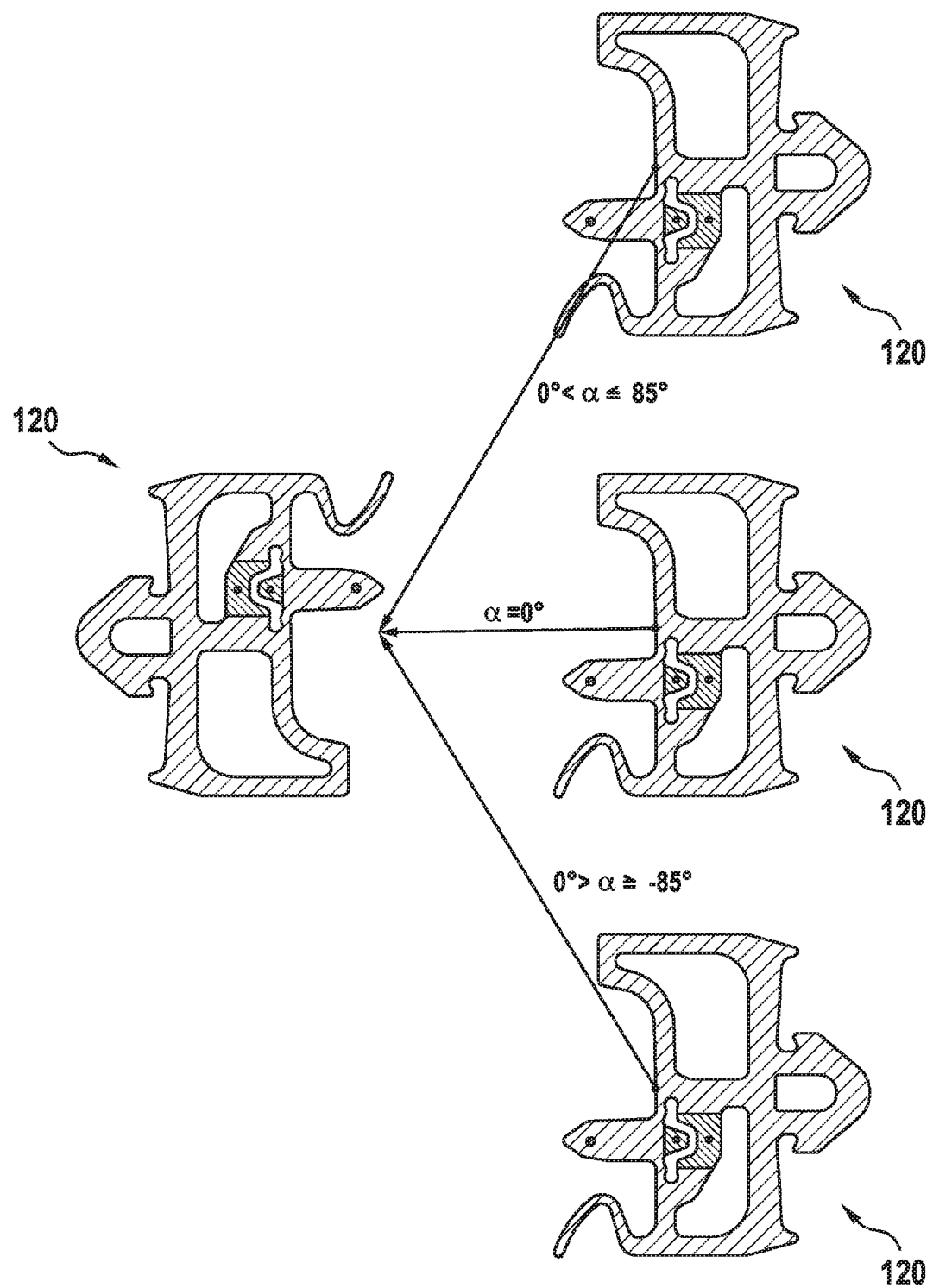
FIG. 9 shows a schematic representation of devices according to an exemplary embodiment.

FIG. 9 shows a schematic representation of devices 120 according to an exemplary embodiment. The representation in FIG. 9 corresponds to the representations from one of FIGS. 5 to 8 with the exception that on the left-hand side in FIG. 9 a first device 120 is shown and on the right-hand side in FIG. 9 a second device 120, at three possible positions in order to illustrate door pivoting-in movements. In the case of synchronized double-leaf doors, the doors and consequently the devices 120 meet one another at an angle of approach $\alpha$ of zero degrees or $\alpha=0°$. In the case of single-leaf doors or asynchronous double-leaf doors, the angle of approach $\alpha$ is between $0°<\alpha\leq85°$ or $0°>\alpha\geq-85°$.

With regard to possible loads on the devices 120, it must be noted that a pressure tightness or water tightness for resistance in relation to false triggering of the switching elements of the devices 120, in particular in the case of aerodynamic pressure loads in the region of the rail vehicle, is between 0.5 and 10 kPa or kilopascals.

Figure 10:
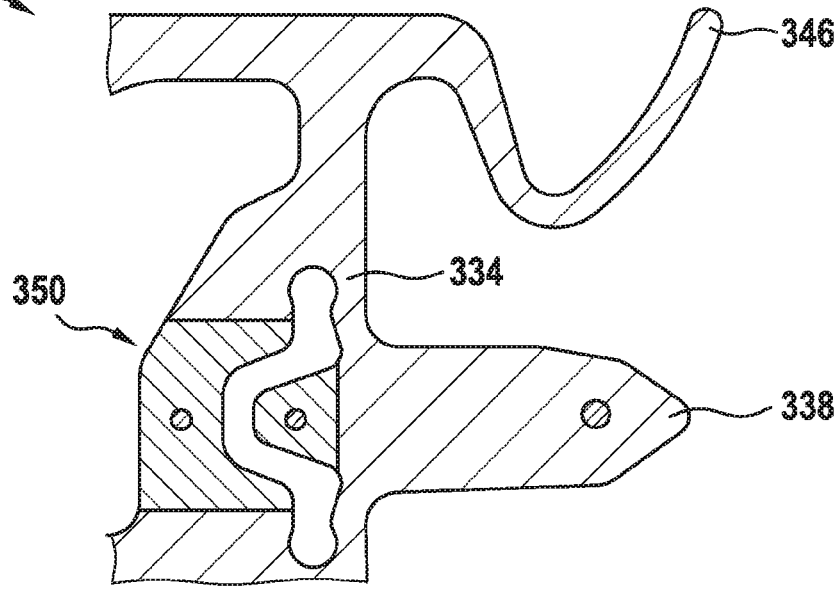
FIG. 10 shows a schematic representation of a part portion of a device according to an exemplary embodiment.

FIG. 10 shows a schematic representation of a part portion of a device 120 according to an exemplary embodiment. The device 120, in this connection, corresponds to the device from FIG. 3. The part portion of the device 120 shown in the representation of FIG. 10 includes substantially the sealing wall 334, the actuating plunger 338, the sealing element 346 and the switching element 350. In this connection, the sealing element 346 is formed as a sealing lip.

Figure 11:
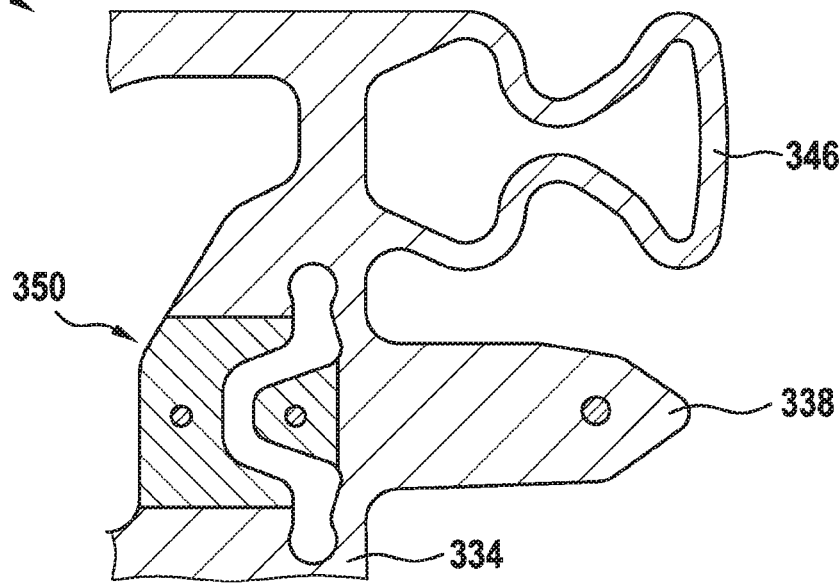
FIG. 11 shows a schematic representation of a part portion of a device according to an exemplary embodiment.

FIG. 11 shows a schematic representation of a part portion of a device 120 according to an exemplary embodiment. In this case, the representation in FIG. 11 corresponds to the representation from FIG. 10 with the exception that the sealing element 346 is formed as a sealing balloon.

Figure 12:
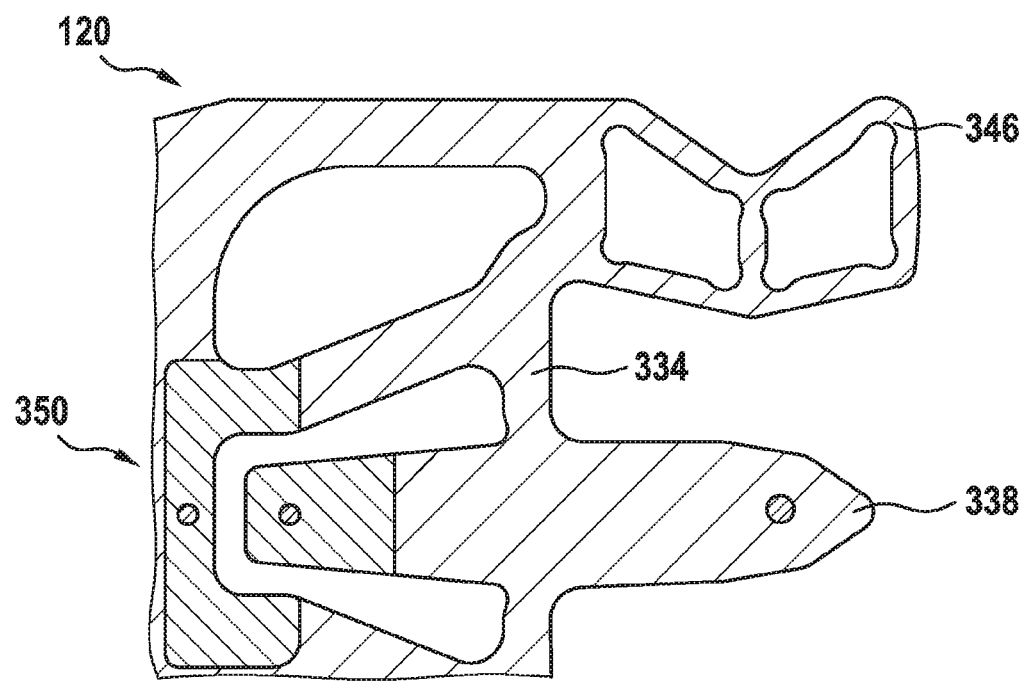
FIG. 12 shows a schematic representation of a part portion of a device according to an exemplary embodiment.

FIG. 12 shows a schematic representation of a part portion of a device 120 according to an exemplary embodiment. In this case, the representation in FIG. 12 corresponds to the representation from FIG. 10 or FIG. 11 with the exception that the sealing element 346 is formed as a double balloon.

Figure 13:
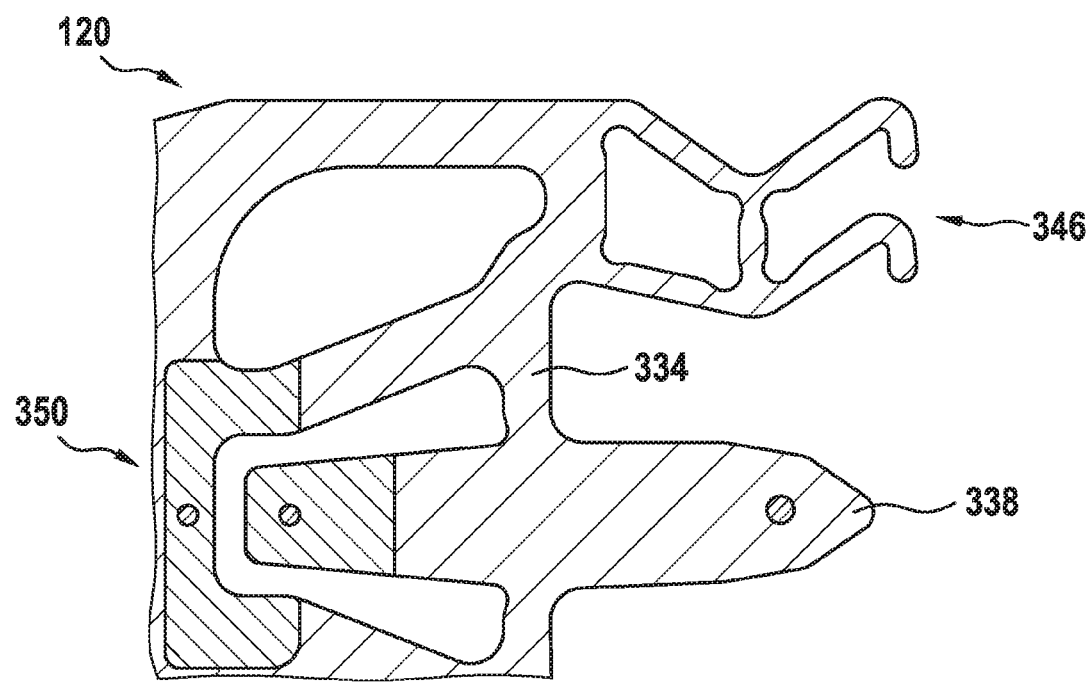
FIG. 13 shows a schematic representation of a part portion of a device according to an exemplary embodiment.

FIG. 13 shows a schematic representation of a part portion of a device 120 according to an exemplary embodiment. In this case, the representation in FIG. 13 corresponds to the representation from FIG. 10, FIG. 11 or FIG. 12 with the exception that the sealing element 346 is formed as a sealing balloon with a double lip.

Figure 14:
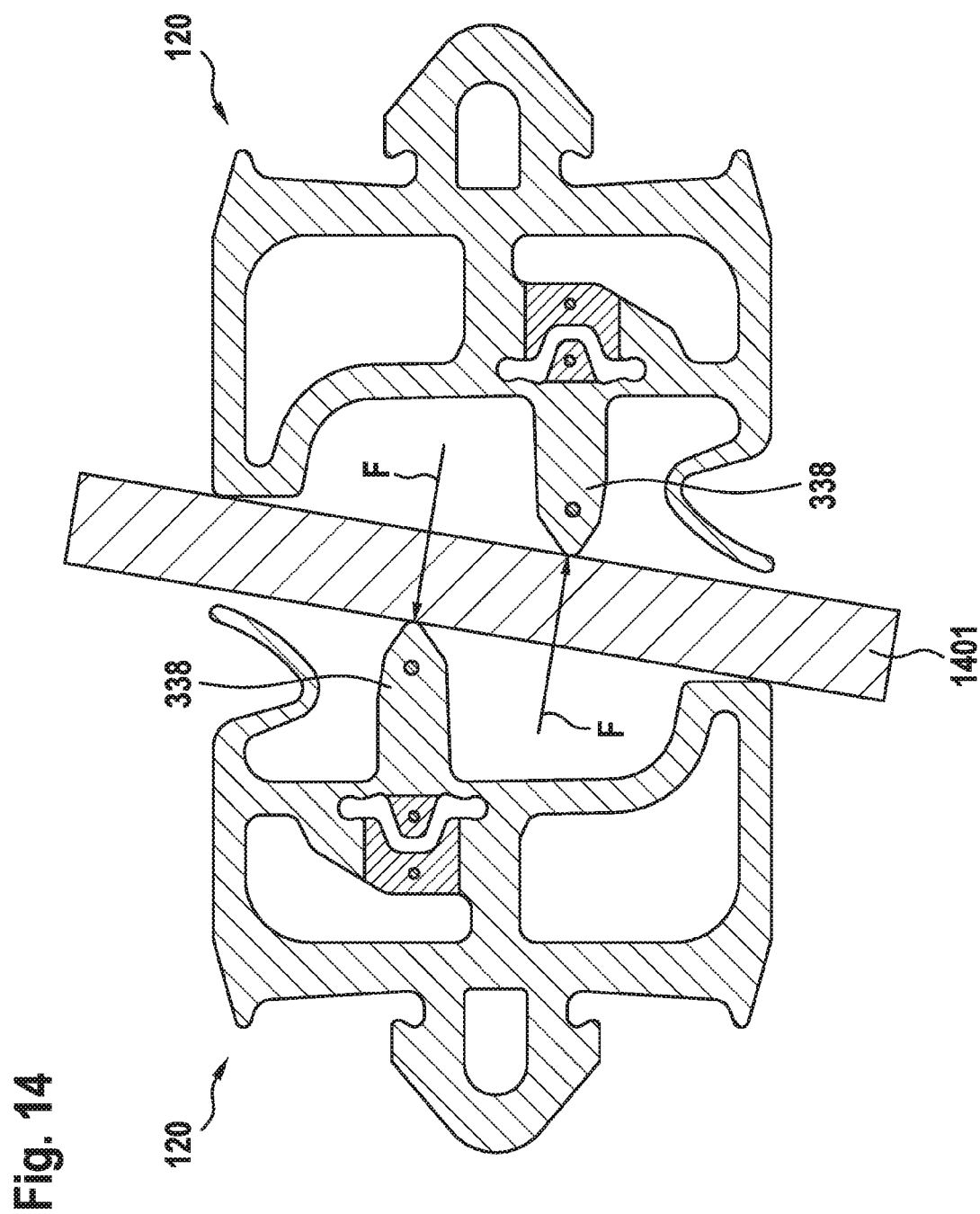
FIG. 14 shows a schematic representation of devices according to an exemplary embodiment.

FIG. 14 shows a schematic representation of devices 120 according to an exemplary embodiment. In this connection, the devices 120 correspond to the devices from one of FIGS. 5 to 9, a test piece 1410, more precisely a rigid test piece 1410, being arranged between the devices 120 in the representation in FIG. 14. The test piece 1410, in this connection, is entrapped between the devices 120 and is in contact with the actuating plungers 338 of the devices 120. In this connection, a force F or compression force F acts on each actuating plunger 338 as a result of the presence of the test piece 1410 between the devices 120.

In other words, protection against entrapment is consequently illustrated in FIG. 14. In the case of rigid test pieces 1401, the actuating plunger 338 is pressed at the force F. Rigid test pieces 1401, for example with dimensions of 10×50 mm, 30×60 mm or the like, are already detected by using the devices 120 before a door-closed-position of a door system is reached.

FIG. 15 shows a schematic representation of devices 120 according to an exemplary embodiment. The representation in FIG. 15 corresponds, in this connection, to the representation from FIG. 14 with the exception that a test material 1501 or an elastic test piece 1501 is entrapped between the devices 120. When the test material 1501 is pulled upward, a force F or compression force F acts on each actuating plunger 338.

In other words, entrapment detection is consequently illustrated in FIG. 15. Elastic test pieces 1501, such as, for example, a material cloth, are detected in a door-closed-position of a door system by pulling upward at a force F of, for example, up to 150 Newtons and at a pull angle β of 0°<β<180°. When pulling elastic test pieces 1501 upward, the actuating plunger 338 is rotated under the effect of the force F. In other words, the force F brings about a movement component of the actuating plunger 338 along the y axis when the elastic test pieces 1501 are pulled upward.

Figure 16:
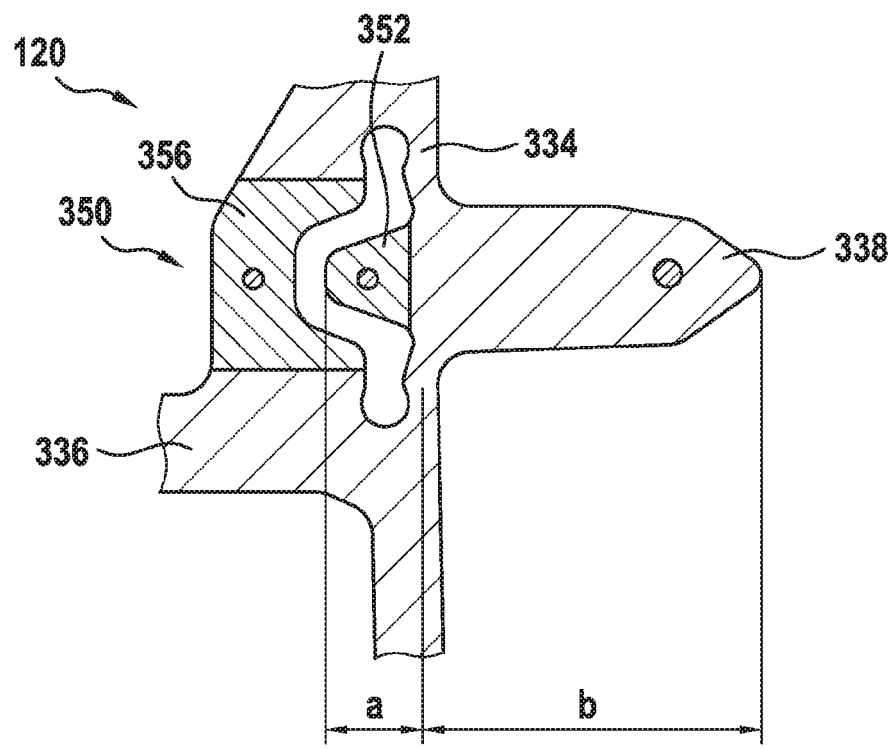
FIG. 16 shows a schematic representation of a part portion of a device according to an exemplary embodiment.

FIG. 16 shows a schematic representation of a part portion of a device 120 according to an exemplary embodiment. The device 120, in this connection, corresponds to the device from FIG. 3. The part portion of the device 120 shown in the representation in FIG. 16 includes substantially the sealing wall 334, the mounting web 336, the actuating plunger 338 and the switching element 350 with the first electrically conductive portion 352 and the second electrically conductive portion 356.

In addition, a first dimension a and a second dimension b are marked in FIG. 16. The first dimension a represents a dimension of the first portion 352 of the switching element 350 along the transverse axis of the device 120. As an alternative to this, the first dimension a represents a dimension of the first portion 352 of the switching element 350 and of the actuating plunger 338 along the transverse axis on a side of the sealing wall 334 facing the door leaf wall. The second dimension b represents a dimension of the actuating plunger 338 along the transverse axis of the device 120 on a side of the sealing wall 334 remote from the door leaf wall. As an alternative to this, the second dimension b represents a dimension of the actuating plunger 338. A ratio between the two dimensions a and b with respect to one another includes a predefined value.

In other words, a transmission ratio of the actuating plunger 338 is illustrated in FIG. 16. In this case, the actuating plunger 338 and surrounding portions of the device 120 and also the switching element 350 can be formed in such a manner that a path or deformation of the actuating plunger 338 and of the switching element 350 is provided with a suitable transmission ratio so that a sensitivity of the switching element 350 can consequently be controlled or a response behavior of the entrapment detection can be adjusted. By modifying a transmission ratio or the ratio between the dimensions a/b, it is possible to adjust a sensitivity of the switching element 350 depending on the requirement with a constant gap between the electrically conductive portions 352 and 356.

Figure 17:
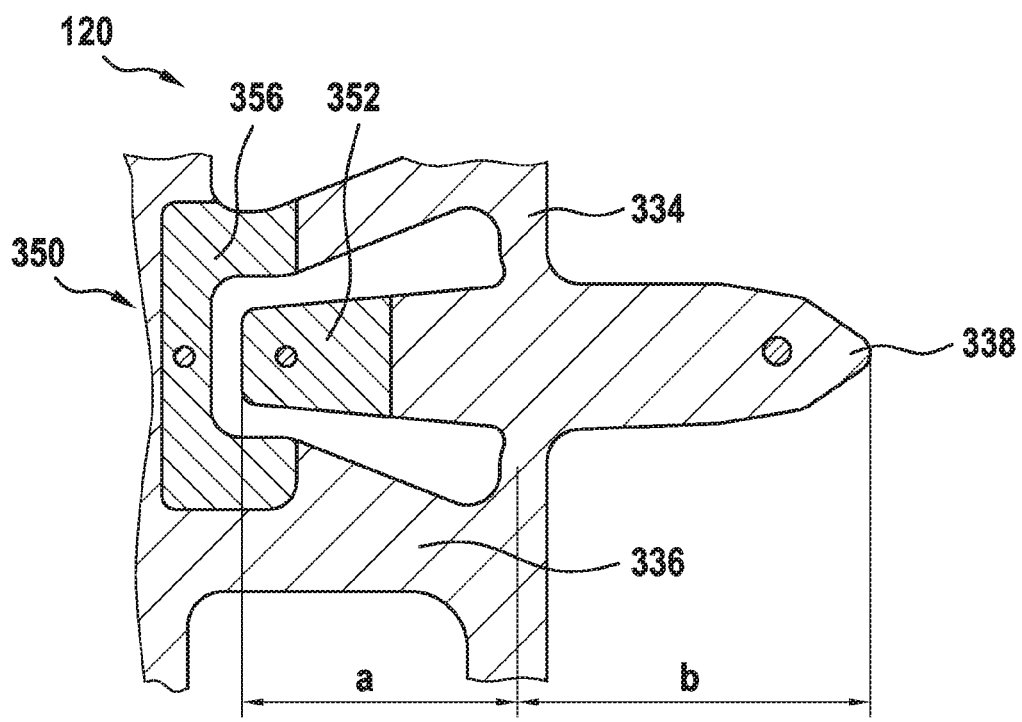
FIG. 17 shows a schematic representation of a part portion of a device according to an exemplary embodiment.

FIG. 17 shows a schematic representation of a part portion of a device 120 according to an exemplary embodiment. The representation in FIG. 17 corresponds, in this connection, to the representation from FIG. 16 with the exception that the ratio between the dimensions a and b is different and the second electrically conductive part portion 356 extends into the mounting web 336.

Figure 18:
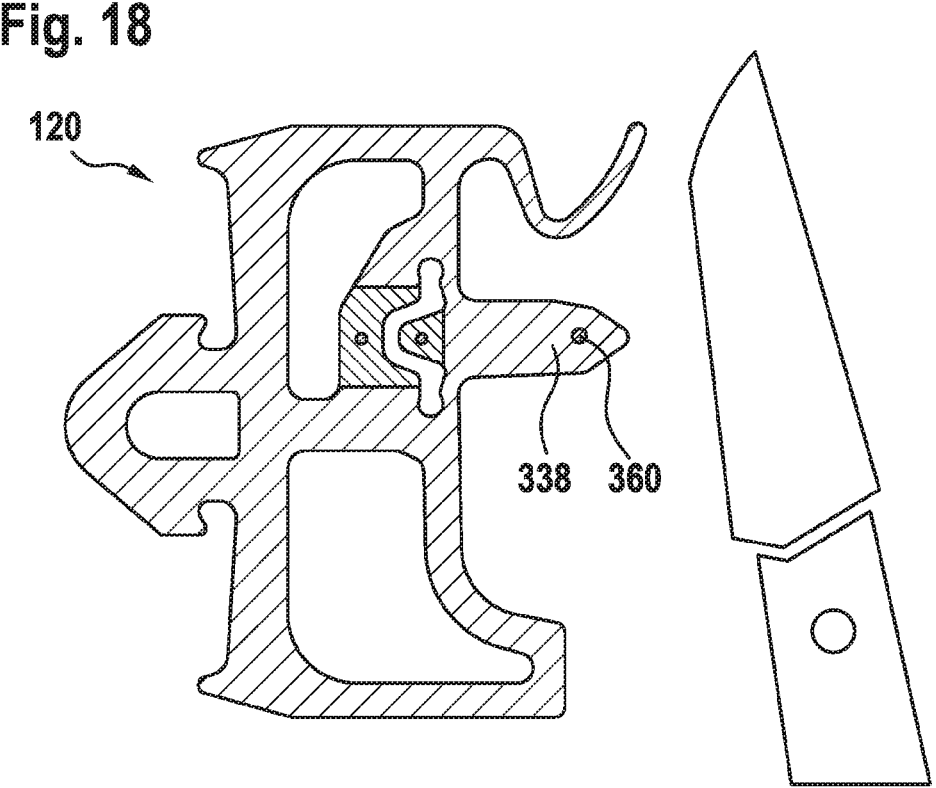
FIG. 18 shows a schematic representation of a device according to an exemplary embodiment.

FIG. 18 shows a schematic representation of a device 120 according to an exemplary embodiment. The device 120, in this connection, corresponds to the device from FIG. 3. Of the device 120, the actuating plunger 338 and the device for protection against cuts 360 are explicitly provided with reference symbols in the representation of FIG. 18. The device for protection against cuts 360 is arranged integrated in the actuating plunger 338. In this case, the device for protection against cuts 360 is realized as a metal wire. The metal wire can be formed, for example, from stainless steel and can be extrudable and able to be cut to length with the extrusion profile.

Figure 19:
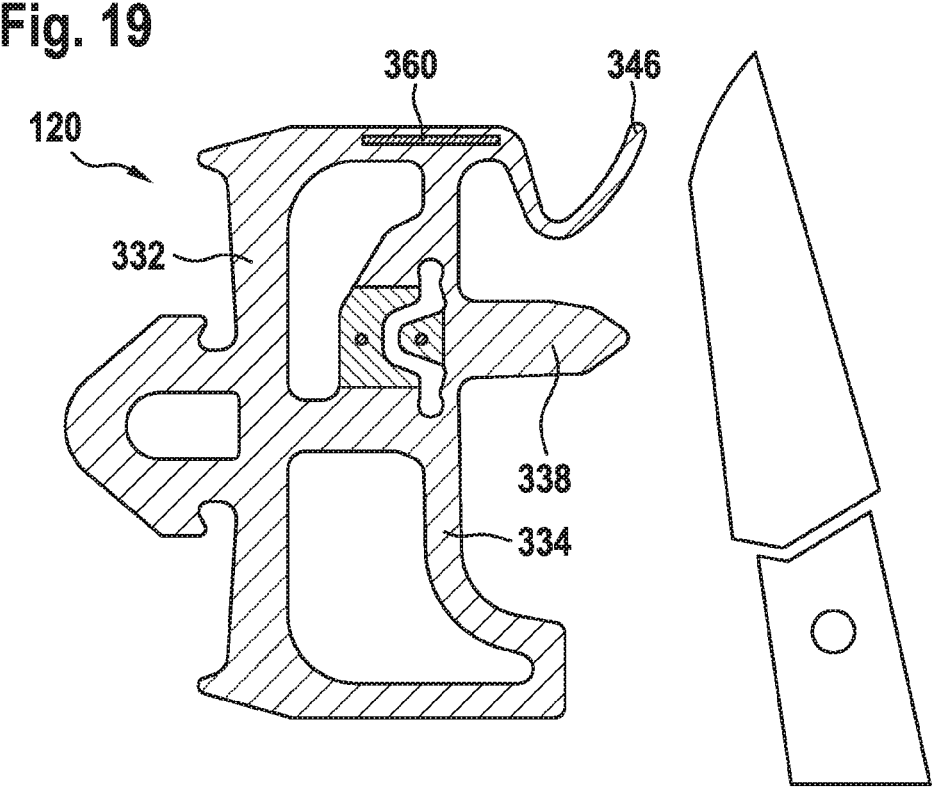
FIG. 19 shows a schematic representation of a device according to an exemplary embodiment.

FIG. 19 shows a schematic representation of a device 120 according to an exemplary embodiment. The device 120 in FIG. 19 corresponds to the device from FIG. 3 or FIG. 18 with the exception that the device for protection against cuts 360 is integrated in a part portion of the extrusion profile of the device 120 adjacent to the sealing wall 334. In this connection, the protection against cuts 360 is realized as a metal band, a metal insert or the like. More precisely, the device for protection against cuts 360, in this connection, is integrated in a side wall between the sealing wall 334 and the door leaf wall 332 and adjacent to the sealing element 346.

With reference, in particular, to FIGS. 18 and 19, it must be noted that the device for protection against cuts 360 can be used as protection against vandalism or for security against vandalism, for example, for the case where an attempt is made using a knife to damage or sever the device 120 and in particular the switching element which means that a function of the entrapment detection is able to be maintained using the device for protection against cuts 360.

Figure 20:
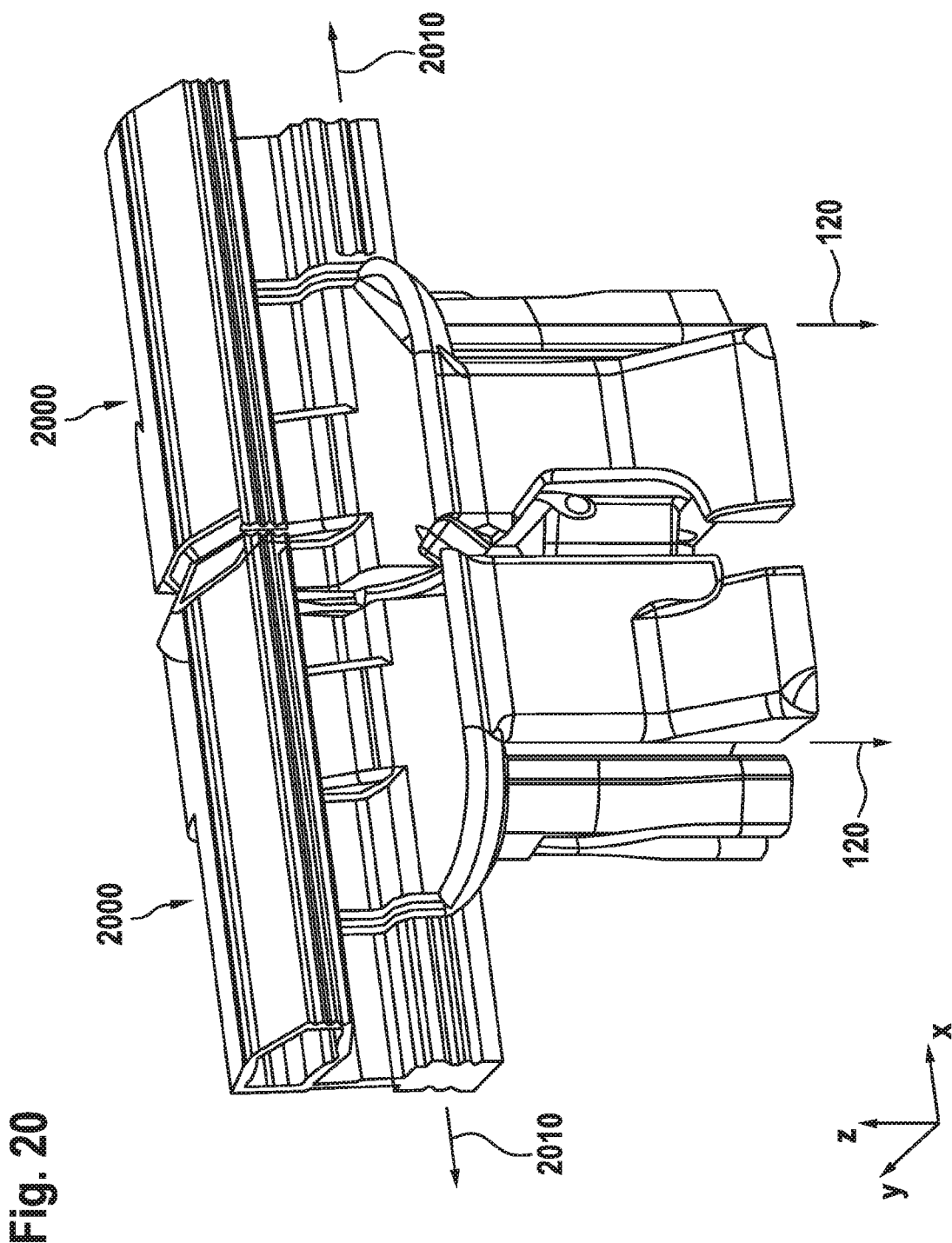
FIG. 20 shows a schematic representation of molded parts according to an exemplary embodiment.

FIG. 20 shows a schematic representation of molded parts 2000 according to an exemplary embodiment. The molded parts 2000 can be used for the door system from FIG. 1 or for a similar door system. In this case, each molded part 2000 functions as a transition between a sealing profile 2010 or a door seal 2010 of a door leaf of a door and a device 120 or a finger protection profile 120. The device 120, in this connection, corresponds to or resembles the device from one of the figures described above.

FIG. 20 shows two molded parts 2000 for two door leaves of a door of a vehicle. In addition, two sealing profiles 2010 and two devices 120 are indicated. The molded parts 2000 can either be bonded to or injected onto the profile. The molded parts 2000 can be used at the top and at the bottom of a door leaf.

Figure 21:
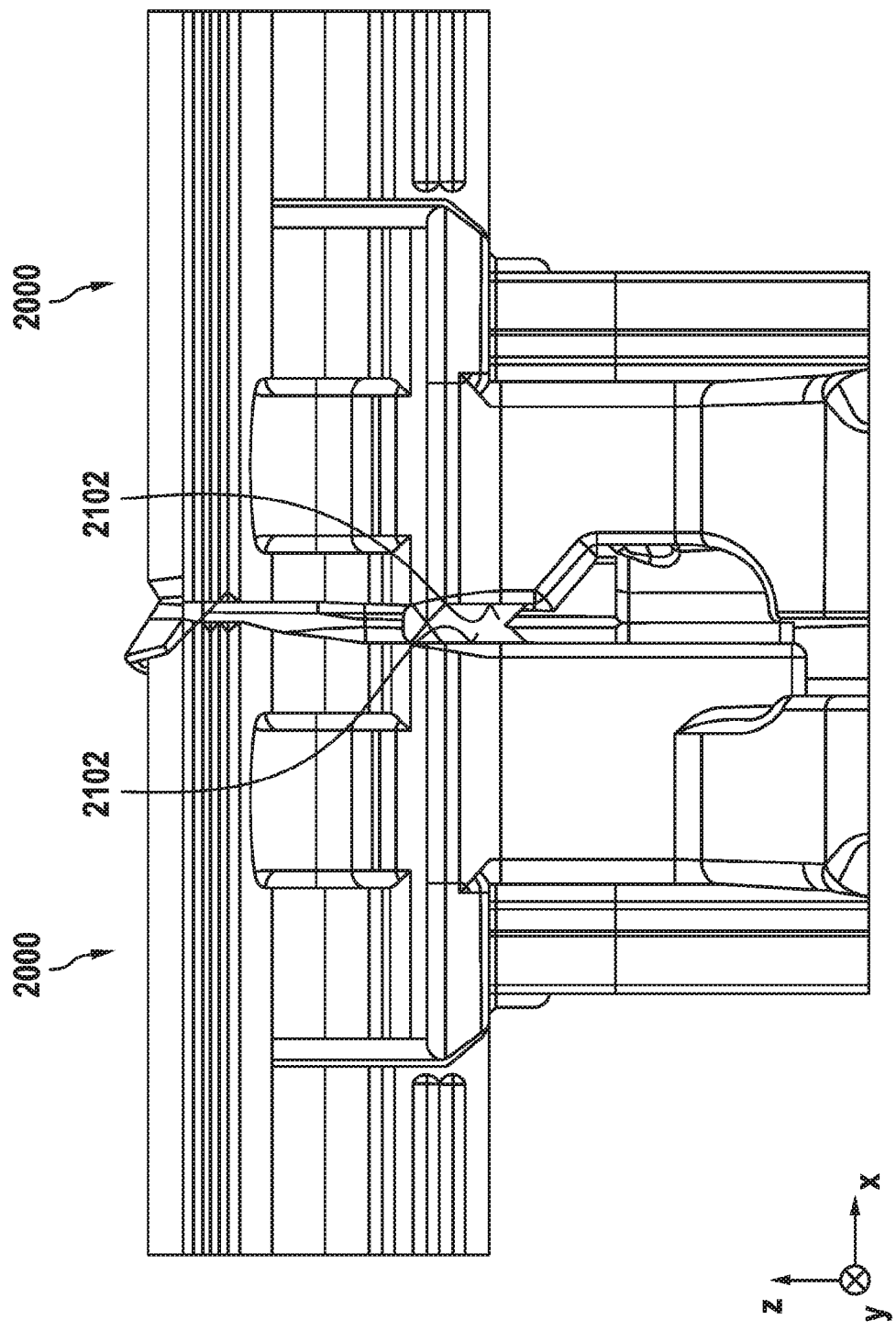
FIG. 21 shows a schematic representation of molded parts according to an exemplary embodiment.

FIG. 21 shows a schematic representation of molded parts 2000 according to an exemplary embodiment. The molded parts 2000 correspond to the molded parts from FIG. 20. FIG. 21 also shows stop surfaces 2102 of the molded parts 2000. The molded parts 2000 can be prevented from being pressed further than admissible in the x direction during an operation to close a door using the stop surfaces 2102. The stop surfaces 2102 can be arranged at the top and/or at the bottom of the molded parts 2000 when the molded parts are mounted in the door system.

Figure 22:
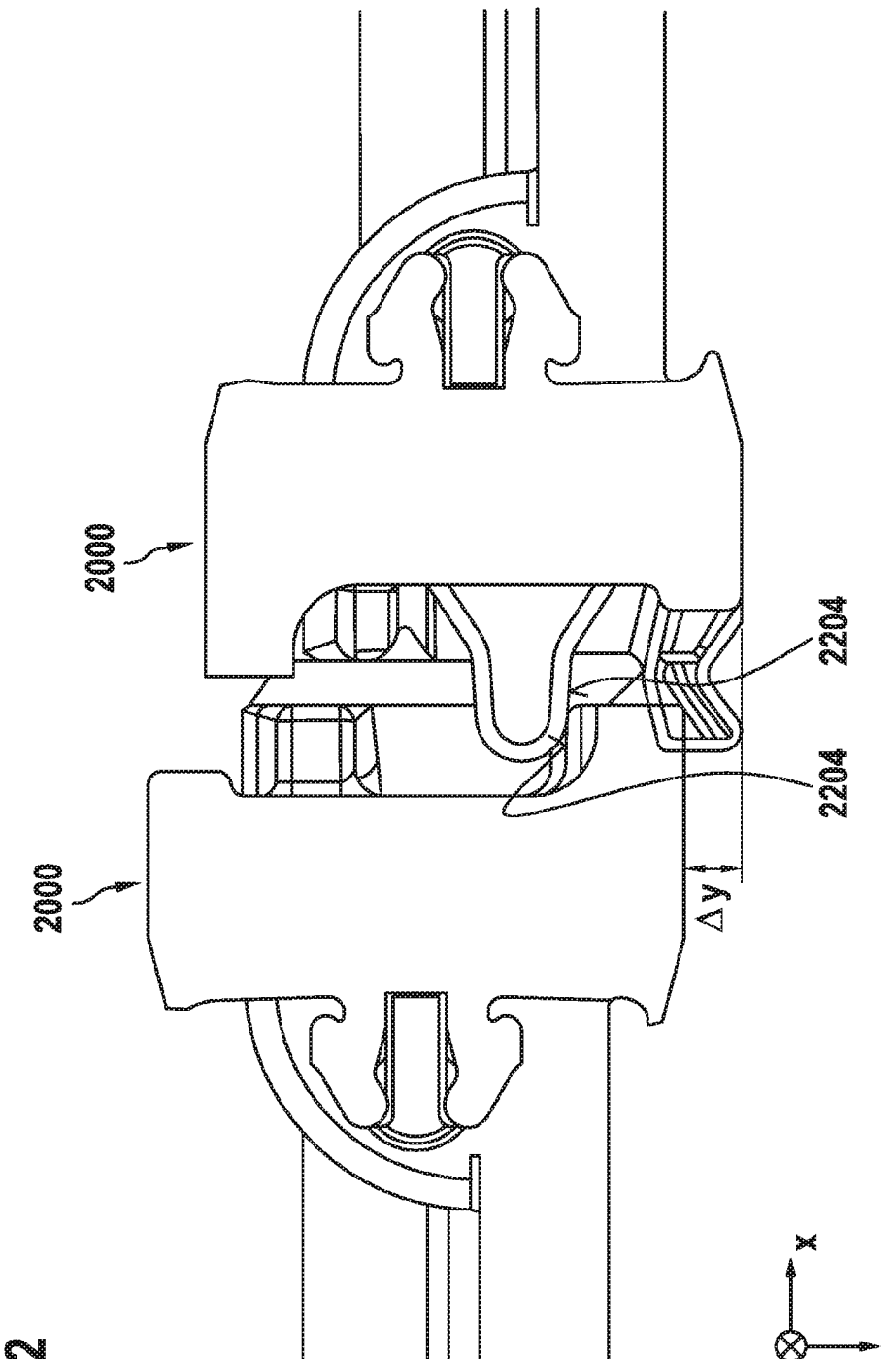
FIG. 22 shows a schematic representation of molded parts according to an exemplary embodiment.

FIG. 22 shows a schematic representation of molded parts 2000 according to an exemplary embodiment. The molded parts 2000 correspond to the molded parts from FIG. 20 or FIG. 21. FIG. 22 also shows wedge surfaces 2204 or run-on wedges 2204 of the molded parts 2000. In this connection, the molded parts 2000 are offset relative to one another along the y axis. The wedge surfaces 2204 or run-on wedges 2204 are formed in order to reduce a y offset Δy or an offset along the y axis.

In other words, to reduce a lateral offset or the y offset Δy, a run-on wedge 2204 is integrated in each molded part 2000 in order to produce a positive locking connection between the molded parts 2000. To reduce the rubber abrasion, a metal insert can be arranged on each wedge surface 2204. The run-on wedges 2204 can be arranged at the top and/or at the bottom of the molded parts 2000.

Figure 23:
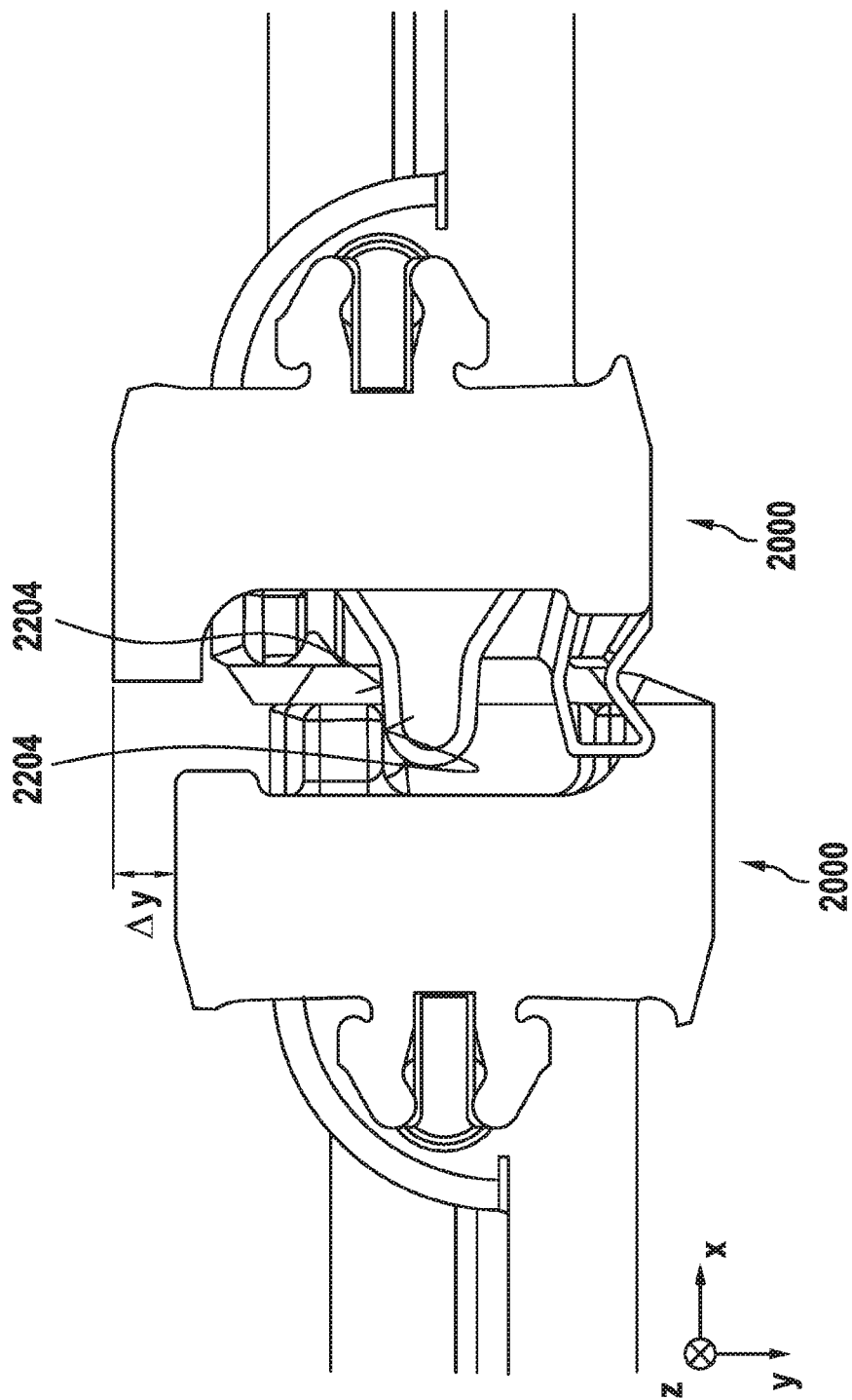
FIG. 23 shows a schematic representation of molded parts according to an exemplary embodiment.

FIG. 23 shows a schematic representation of molded parts 2000 according to an exemplary embodiment. The representation in FIG. 23, in this connection, corresponds to the representation from FIG. 22 with the exception that the molded parts 2000 are offset relative to one another in the opposite direction along the y axis.

With reference to FIGS. 20 to 23, it must also be noted that the molded parts 2000 can include a drainage so that in the event of possible water ingress into the molded parts 2000, penetrated water is able to be discharged to the outside again.

Figure 24:
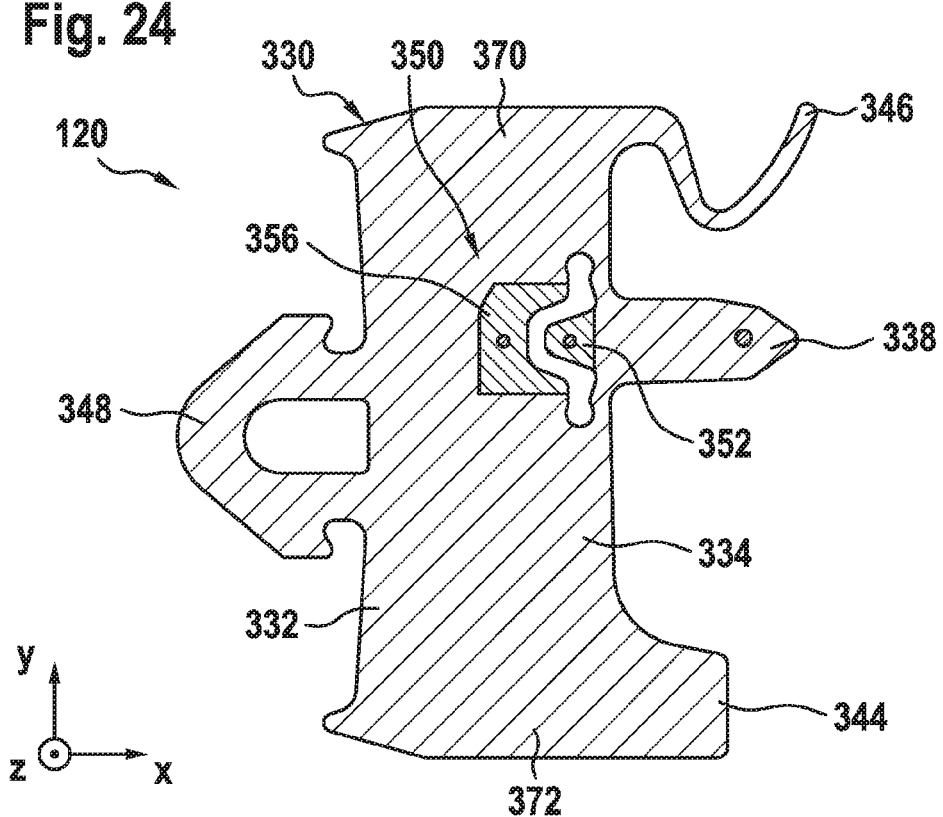
FIG. 24 shows a schematic representation of a device according to an exemplary embodiment.

FIG. 24 shows a schematic representation of a device 120 according to an exemplary embodiment. In this case, the device 120 corresponds to the device from one of FIGS. 3, 5 to 10 and 14 to 19 with the exception that the device 120 in FIG. 24 includes an extrusion profile 330 which is formed as a solid profile. Consequently, a mounting web and a partition wall are omitted.

The extrusion profile 330 is filled out with elastomer material between the door leaf wall 332 and the sealing wall 334 and between the first side wall 370 and the second side wall 372, with the exception of the space between the first electrically conductive portion 352 and the second electrically conductive portion 356 of the switching element. In this connection too, a transmission of force can be directed past the switching element during mounting.

Figure 25:
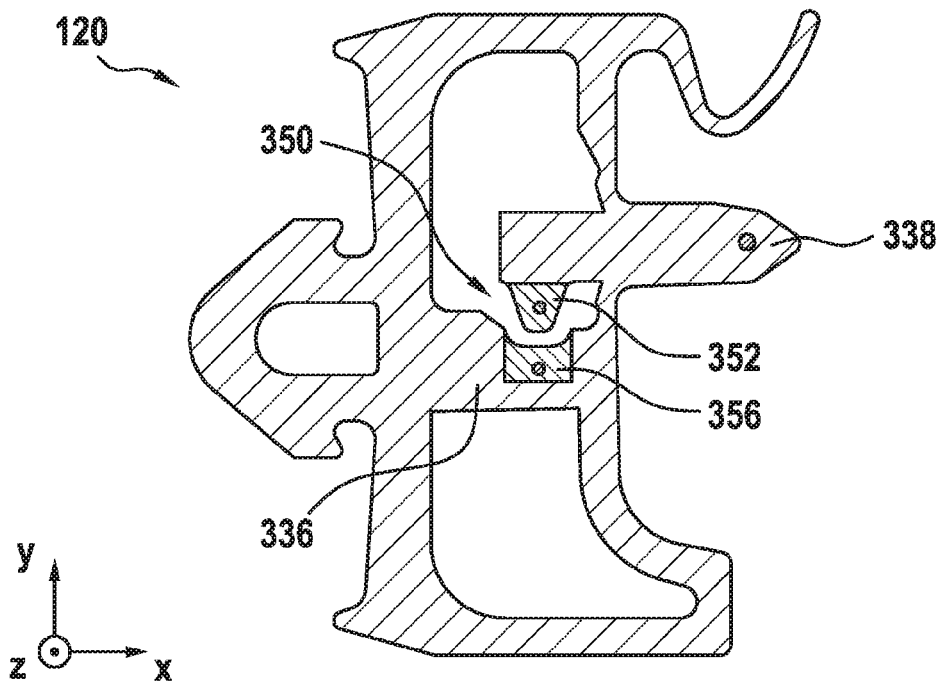
FIG. 25 shows a schematic representation of a device according to an exemplary embodiment.

FIG. 25 shows a schematic representation of a device 120 according to an exemplary embodiment. In this case, the device 120 corresponds to the device from one of FIGS. 3, 5 to 10 and 14 to 19 with the exception that the device 120 in FIG. 25 includes a switching element 350 where the space, which is compressible by the compression force, extends along the transverse axis x between the first portion 352 and the second portion 356. A partition wall is omitted in this connection.

In this case, the first portion 352 of the switching element 350 is arranged on the actuating plunger 338. The second portion 356 is arranged on the mounting web 336. In this connection, the first portion 352 is arranged between the second portion 356 and the actuating plunger 338 with reference to an axis y which runs transversely relative to the transverse axis x. The first portion 352 and the second portion 356 of the switching element 350 are also arranged between the mounting web 336 and the actuating plunger 338 with reference to the axis y which runs transversely relative to the transverse axis x.

The switching element 350 is consequently able to be triggered in the case of a movement of the actuating plunger 338 along the axis y which runs transversely relative to the transverse axis x responding to a compression force.

Figure 26:
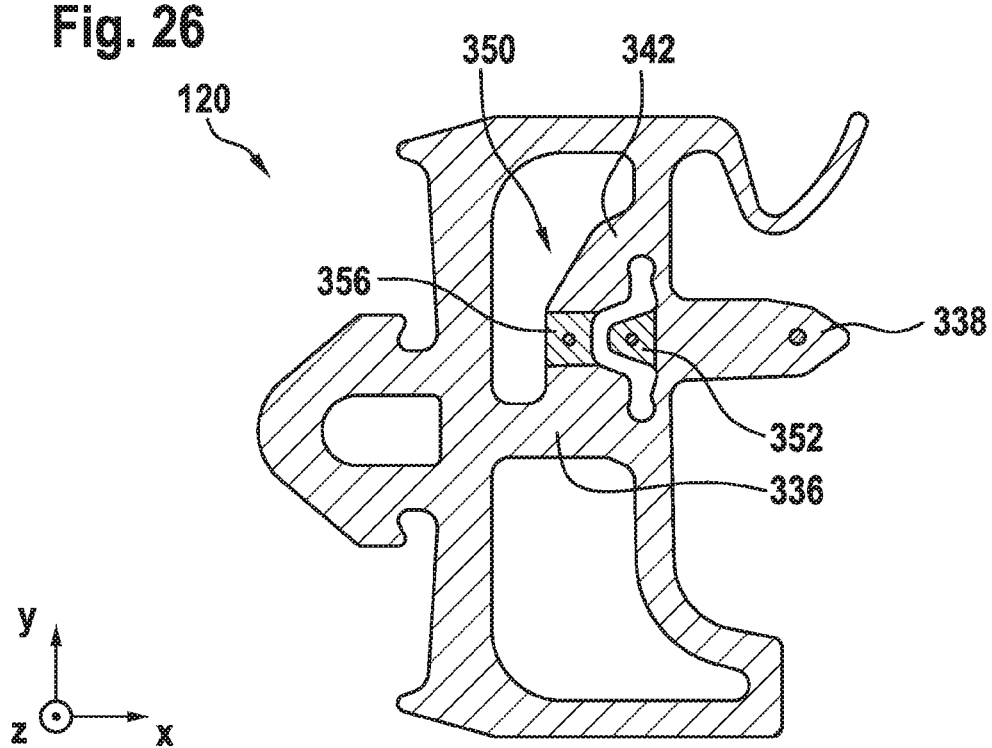
FIG. 26 shows a schematic representation of a device according to an exemplary embodiment.

FIG. 26 shows a schematic representation of a device 120 according to an exemplary embodiment. In this case, the device 120 corresponds to the device from one of FIGS. 3, 5 to 10 and 14 to 19 with the exception that, in the case of the device 120 in FIG. 26, the second electrically conductive portion 356 of the switching element is formed or arranged in a different part portion of the partition wall 342.

More precisely, the second portion 356 is arranged in a smaller part portion of the partition wall 342 than in the case of the devices from the figures named above. According to a different exemplary embodiment, the portions 352 and 356 of the switching element can be formed depending on the requirement. According to an exemplary embodiment, the switching element is designed to be switched or triggered only when a compression force acts on the actuating plunger 338 along the transverse axis x.

Figure 27:
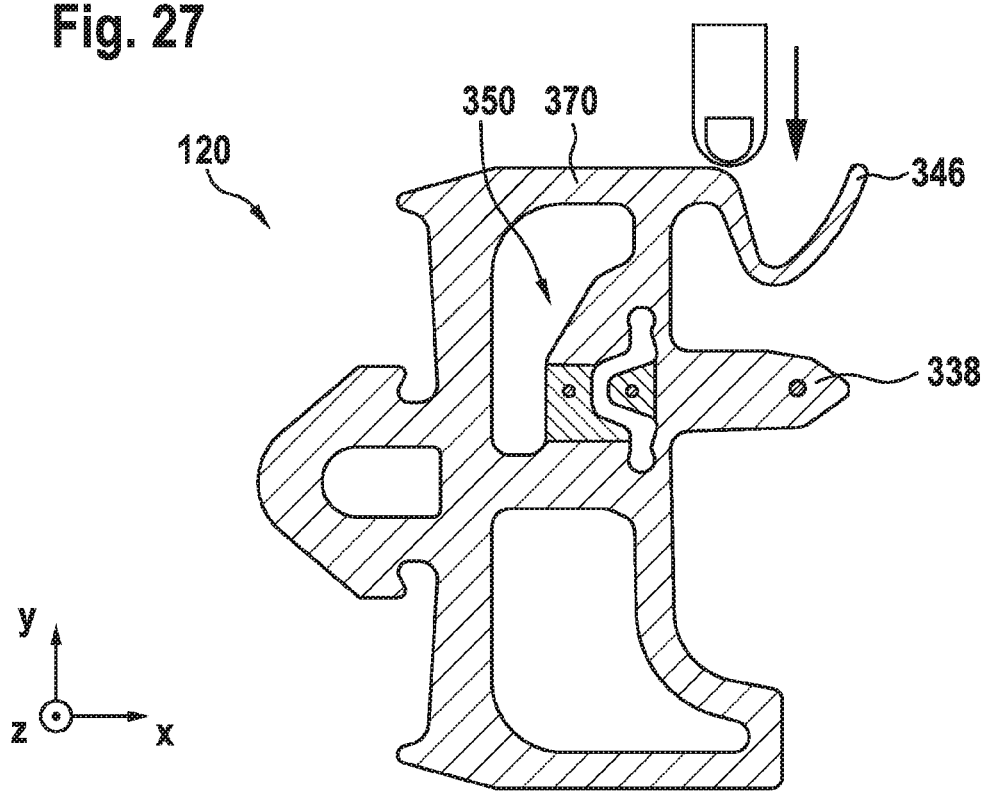
FIG. 27 shows a schematic representation of a device according to an exemplary embodiment.

FIG. 27 shows a schematic representation of a device 120 according to an exemplary embodiment. In this case, the device 120 corresponds to the device from one of FIGS. 3, 5 to 10 and 14 to 19. In addition, FIG. 27 illustrates that someone is about to press on the device 120 with a finger, for example within an act of vandalism, along an axis y which runs transversely relative to the transverse axis x. The finger, in this connection, is arranged adjacent to the first side wall 370 and the sealing element 346. In this connection, the actuating plunger 338 would simply rotate. Detection of such a case of vandalism by the switching element 350 is not provided in this connection. The device 120, however, provides vandalism protection against the pressing of an object onto the device 120 along the axis y which runs transversely relative to the transverse axis x.

Figure 28:
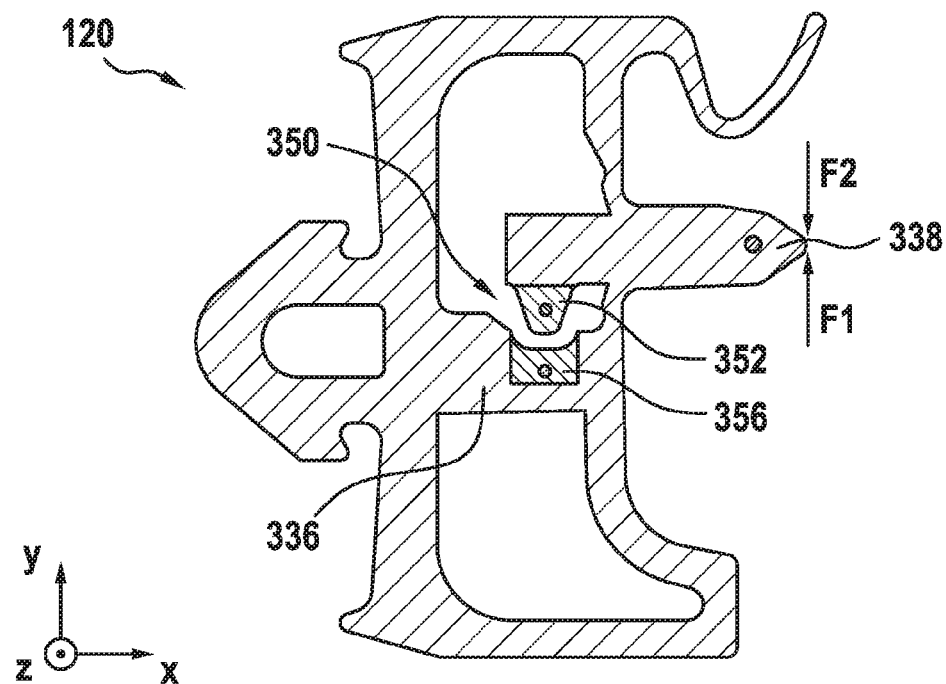
FIG. 28 shows a schematic representation of a device according to an exemplary embodiment.

FIG. 28 shows a schematic representation of a device 120 according to an exemplary embodiment. In this case, the device 120 corresponds to the device from FIG. 25, two directional arrows being added in the representation for a force F1 acting on the actuating plunger 338 in a first direction along the axis y which runs transversely relative to the transverse axis x and for a force F2 acting on the actuating plunger 338 in a second direction along the axis y which runs transversely relative to the transverse axis x.

According to the exemplary embodiment shown here, the switching element 350 is designed in order to be switched or triggered when the force F1 acts in the first direction along the axis y which runs transversely to the transverse axis x on the actuating plunger 338. In this case, the first electrically conductive portion 352 and the second electrically conductive portion 356 of the switching element 350 come into contact with one another. More precisely, the switching element 350 is designed, in this connection, only to switch when the force F1 acts on the actuating plunger 338 in the first direction along the axis y which runs transversely relative to the transverse axis x. The force F2, in the second direction along the axis y which runs transversely relative to the transverse axis x, causes the first portion 352 and the second portion 356 of the switching element 350 to move away from one another.

Figure 29:
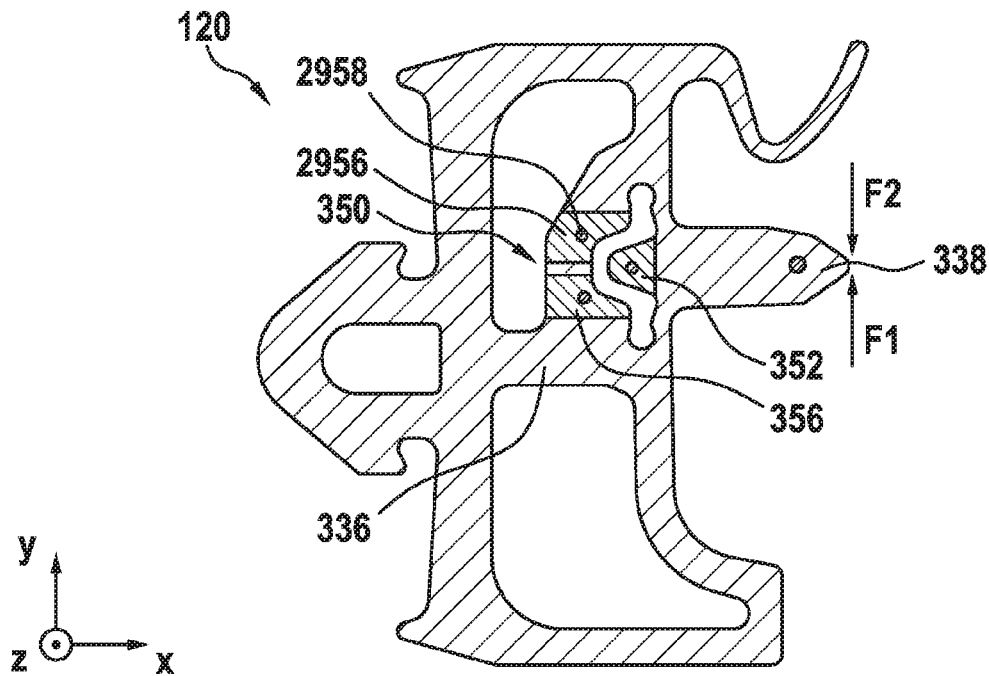
FIG. 29 shows a schematic representation of a device according to an exemplary embodiment.

FIG. 29 shows a schematic representation of a device 120 according to an exemplary embodiment. In this case, the device 120 resembles the device from one of the figures described above with the exception that the switching element 350, in addition to the first electrically conductive portion 352 and the second electrically conductive portion 356, also includes a further electrically conductive portion 2956 with a further electrical conductor 2958. In addition, two directional arrows are shown for a force F1 acting on the actuating plunger 338 in a first direction along the axis y which runs transversely relative to the transverse axis x and a force F2 acting on the actuating plunger 338 in a second direction along the axis y which runs transversely relative to the transverse axis x.

The further portion 2956 is arranged adjacent to the second portion 356. In this case, the further portion 2956 is separated or isolated electrically from the second portion 356. More precisely, the further portion 2956 and the second portion 356 are arranged spaced from one another along the axis y which runs transversely relative to the transverse axis x. The first portion 352 and the second portion 356 are separated from one another by a space which is compressible in the first direction by the force F1. The first portion 352 and the further portion 2956 are separated from one another by a space which is compressible in the second direction by the force F2.

When the force F1 acts on the actuating plunger 338 in the first direction along the axis y which runs transversely relative to the transverse axis x, the first portion 352 and the second portion 356 of the switching element 350 come into contact with one another. When the force F2 acts on the actuating plunger 338 in the second direction along the axis y which runs transversely relative to the transverse axis x, the first portion 352 and the further portion 2956 of the switching element 350 come into contact with one another. As a result, with corresponding cabling and evaluation, information can be obtained regarding whether, in the case of an object entrapped in a door gap, a force acts from outside or inside with reference to the vehicle or a force F1 acts in the first direction or a force F2 acts in the second direction when it is pulled out.

LIST OF REFERENCES

100 Vehicle
110 Door system
112 Door
114 Door leaf
120 Device for protection against entrapment
200 Method for production
210 Step of extrusion
220 Step of integration
230 Step of cutting to length
330 Extrusion profile
332 Door leaf wall
334 Sealing wall
336 Mounting web
338 Actuating plunger
342 Partition wall
344 Sealing surface
346 Sealing element
348 Attachment portion
350 Switching element
352 First electrically conductive portion
354 First electrical conductor
356 Second electrically conductive portion
358 Second electrical conductor
360 Device for protection against cuts
370 First outside wall
372 Second outside wall
455 Terminating resistor
470 Plug
A Nominal rubber width
B Width of finger protection rubber or door leaf width
n Offset distance
Δx Pressing tolerance
Δy Lateral offset
U Overlap
α Angle of approach
F Compression force or force acting on actuating plunger
1401 Test piece
β Pull angle
1501 Test material
a First dimension
b Second dimension
2000 Molded part
2010 Sealing profile
2102 Stop surface
2204 Run-on wedge or wedge surface
F1 Force in first direction
F2 Force in second direction
2956 Further electrically conductive portion
2958 Further electrical conductor

The invention claimed is:

1. A device for protection against entrapment for a door for a vehicle, wherein the device comprises the following features:
   an extrusion profile, wherein the extrusion profile is extruded from an elastomer material, wherein the extrusion profile comprises a door leaf wall which, with the device in a mounted state on the door, faces an impact edge of a door leaf of the door, wherein the extrusion profile further comprises a sealing wall which is arranged opposite to the door leaf wall and an actuating plunger for transmitting a compression force into the extrusion profile, wherein the actuating plunger is arranged on the sealing wall and extends away from the door leaf wall along a transverse axis of the extrusion profile;
   at least one switching element for detecting a compression of the extrusion profile, wherein the at least one switching element is arranged between the door leaf wall and the actuating plunger in a region of the actuating plunger,
   at least one reinforcement element, wherein the reinforcement element is a metal wire or metal band integrated into the extrusion profile, wherein the reinforcement element is integrated in the actuating plunger or in a part portion of the extrusion profile adjacent to the sealing wall, and a mounting web, wherein the mounting web extends along the transverse axis of the extrusion profile and connects to the door leaf wall and the sealing wall forming two chambers between the door leaf wall and the sealing wall, and wherein the mounting web is arranged offset with respect to the actuating plunger along an extension plane of the sealing wall.

2. The device of claim 1, wherein the switching element comprises a first electrically conductive portion and a second electrically conductive portion which are separated from one another by a space which is compressible by the compression force.

3. The device of claim 2, wherein the first electrically conductive portion is arranged on the sealing wall facing the door leaf wall in the region of the switching actuating plunger and the second electrically conductive portion is arranged between the first electrically conductive portion and the door leaf wall with reference to the transverse axis, or wherein the space which is compressible by the compression force extends along the transverse axis.

4. The device of claim 2, where the second electrically conductive portion of the switching element is arranged on a partition wall or as a part portion of a partition wall between the sealing wall and the door leaf wall.

5. The device of claim 2, where a ratio of a dimension of the actuating plunger along the transverse axis to a dimension of the first electrically conductive portion of the switching element along the transverse axis comprises a predefined value.

6. The device of claim 1, wherein the extrusion profile further comprises a sealing surface and a sealing element, wherein the sealing surface and the sealing element are connected to the sealing wall and extending away from the door leaf wall, wherein the actuating plunger is arranged between the sealing surface and the sealing element.

7. The device of claim 6, wherein the sealing element is formed as a sealing lip, a sealing balloon, a double balloon or a double lip.

8. The device of claim 1, wherein the extrusion profile comprises an attachment portion for attaching the device to the door, wherein the attachment portion is connected to the door leaf wall and extends along the transverse axis in the direction away from the sealing wall.

9. A door system for a vehicle, the door system comprising:
   a door having at least one door leaf, and
   a device for protection against entrapment for the door for a vehicle, wherein the device includes:
   an extrusion profile extruded from an elastomer material, wherein the extrusion profile comprises a door leaf wall which, with the device in a mounted state on the door, faces an impact edge of a door leaf of the door, a sealing wall which is arranged opposite with reference to the door leaf wall and an actuating plunger for transmitting a compression force into the extrusion profile, wherein the actuating plunger is arranged on the sealing wall and extends away from the door leaf wall along a transverse axis of the extrusion profile;
   at least one switching element for detecting a compression of the extrusion profile, wherein the at least one switching element is arranged between the door leaf wall and the actuating plunger in a region of the actuating plunger, and
   at least one reinforcement element, wherein the reinforcement element is a metal wire or metal band integrated into the extrusion profile, wherein the reinforcement element is integrated in the actuating plunger or in a part portion of the extrusion profile adjacent to the sealing wall, and a mounting web, wherein the mounting web extends along the transverse axis of the extrusion profile and connects to the door leaf wall and the sealing wall forming two chambers between the door leaf wall and the sealing wall, and wherein the mounting web is arranged offset with respect to the actuating plunger along an extension plane of the sealing wall.

10. The door system of claim 9, having at least one molded part, wherein the molded part functions as a transition between a door seal of a door leaf of the door and the device.

11. A method for producing a device for protection against entrapment for a door for a vehicle, wherein the method comprises:
   extruding elastomer material to form an extrusion profile, wherein the extrusion profile comprises a door leaf wall which, with the device in a state mounted on the door, faces an impact edge of a door leaf of the door, a sealing wall which is arranged opposite with reference to the door leaf wall and an actuating plunger for transmitting a compression force into the extrusion profile, wherein the actuating plunger is arranged on the sealing wall and extends away from the door leaf wall along a transverse axis of the extrusion profile;
   integrating at least one switching element into the extrusion profile for detecting a compression of the extrusion profile, wherein the at least one switching element is arranged between the door leaf wall and the actuating plunger in a region of the actuating plunger; and
   cutting the extrusion profile to a desired length, wherein the switching element is cut to length with the extrusion profile,
   wherein the device further comprises at least one reinforcement element, wherein the reinforcement element is a metal wire or metal band integrated into the extrusion profile, wherein the reinforcement element is integrated in the actuating plunger or in a part portion of the extrusion profile adjacent to the sealing wall, and a mounting web, wherein the mounting web extends along the transverse axis of the extrusion profile and connects to the door leaf wall and the sealing wall forming two chambers between the door leaf wall and the sealing wall, and wherein the mounting web is arranged offset with respect to the actuating plunger along an extension plane of the sealing wall.

12. The method of claim 11, wherein the extruding and the integrating are carried out jointly, wherein the switching element is extruded with the elastomer material, or wherein, in the integrating the at least one switching element or a further switching element is vapor deposited onto the elastomer material.

* * * * *